United States Patent
Takashima et al.

(10) Patent No.: US 11,310,378 B2
(45) Date of Patent: Apr. 19, 2022

(54) SYSTEM AND IMAGE PROCESSING DEVICE WITH EVALUATION VALUE INDICATION

(71) Applicant: SHARP KABUSHIKI KAISHA, Sakai (JP)

(72) Inventors: Masahiko Takashima, Sakai (JP); Daisaku Imaizumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/138,333

(22) Filed: Dec. 30, 2020

(65) Prior Publication Data

US 2021/0211549 A1    Jul. 8, 2021

(30) Foreign Application Priority Data

Jan. 8, 2020  (JP) ............... JP2020-001620

(51) Int. Cl.
*H04N 1/00* (2006.01)
*H04N 1/60* (2006.01)

(52) U.S. Cl.
CPC ....... *H04N 1/0044* (2013.01); *H04N 1/00424* (2013.01); *H04N 1/00427* (2013.01); *H04N 1/6083* (2013.01)

(58) Field of Classification Search
CPC ............. H04N 1/00161; H04N 1/0044; H04N 1/00442; H04N 1/00427; H04N 1/00424; H04N 1/32776; H04N 2201/0075; G06F 3/1292; G06F 3/1208; G06F 3/1256
USPC .............................. 358/1.13, 1.15, 1.16, 1.18
See application file for complete search history.

(56) References Cited

U.S. PATENT DOCUMENTS

| | | | |
|---|---|---|---|
| 2006/0012833 A1* | 1/2006 | Ito | H04N 1/00782 358/400 |
| 2009/0161970 A1 | 6/2009 | Harada | |
| 2009/0190192 A1* | 7/2009 | Kohara | H04N 1/00005 358/505 |
| 2011/0085188 A1* | 4/2011 | Matsuoka | H04N 1/00442 358/1.9 |
| 2014/0240740 A1* | 8/2014 | Salgado | G06F 3/1256 358/1.13 |
| 2020/0336604 A1* | 10/2020 | Takashima | H04N 1/00005 |

FOREIGN PATENT DOCUMENTS

JP        4934015 B2    5/2012

* cited by examiner

*Primary Examiner* — Kent Yip
(74) *Attorney, Agent, or Firm* — ScienBiziP, P.C.

(57) ABSTRACT

A system includes an image processing device connected to a transmission and reception device that communicates with an external device, and a terminal device connected to a display device. The image processing device includes an evaluation value calculation processor that calculates, for each of two or more types of output modes, an evaluation value of output image data when image data is output in the output mode, and an evaluation information transmitter that transmits evaluation information including information based on the evaluation value for each of the output modes, to the terminal device, via the transmission and reception device. The terminal device includes a display controller that performs control of displaying, for each of the output modes, the information based on the evaluation value corresponding to the output mode, on the display device, if the evaluation information is received.

9 Claims, 22 Drawing Sheets

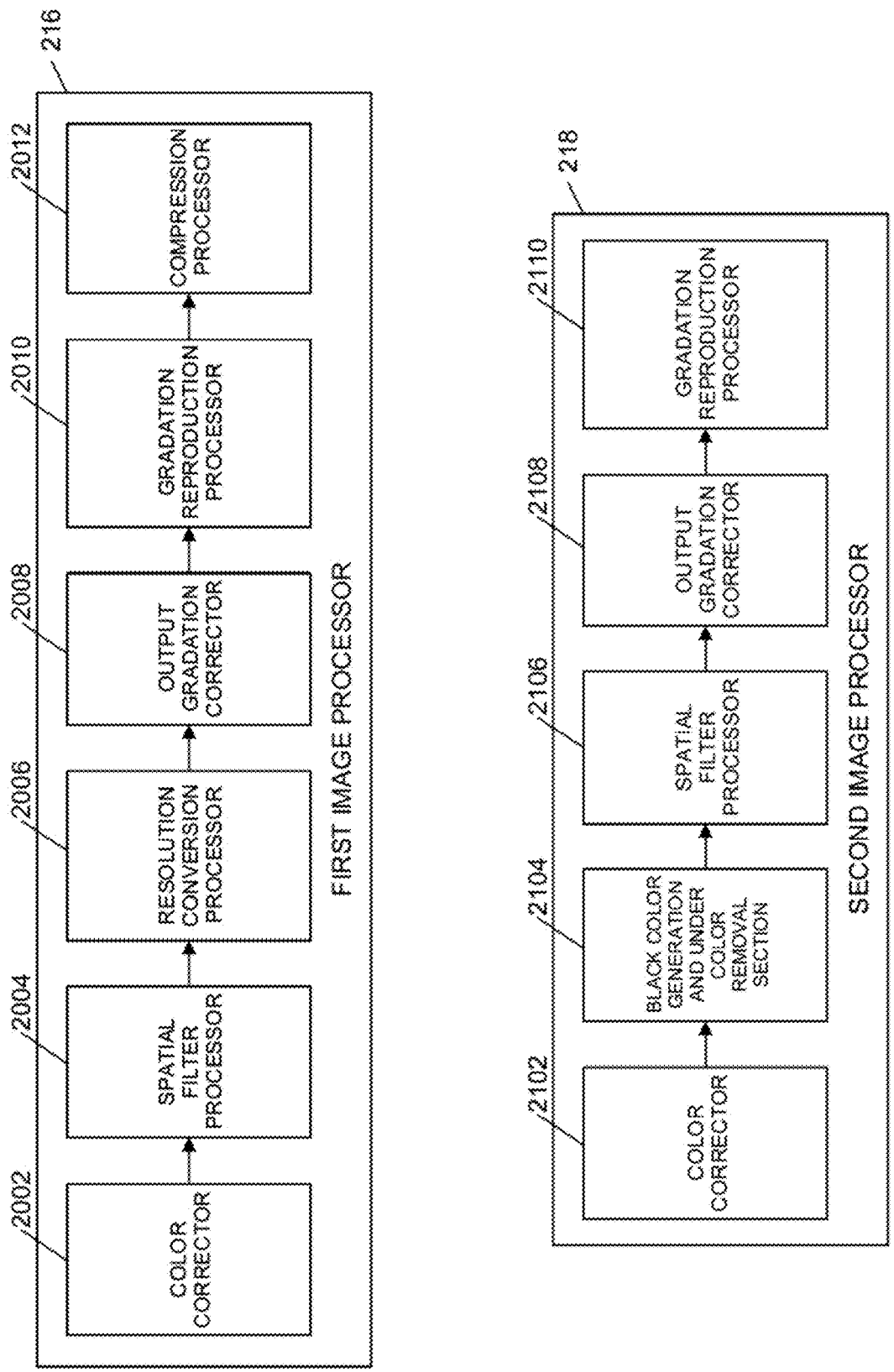

FIG. 4

| JOB ID | READING DATE AND TIME | IMAGE DATA ID | EVALUATION VALUE BY OUTPUT MODE | |
| --- | --- | --- | --- | --- |
| | | | OUTPUT MODE | EVALUATION VALUE |
| J0001 | SEPTEMBER 2, 2019 09:30:00 | J0001-0001 | MONOCHROME BINARY MODE | DEGREE OF INFORMATION LOSS: 90 FILE SIZE: 30 KB |
| | | | 3-BIT GRAYSCALE MODE | DEGREE OF INFORMATION LOSS: 20 FILE SIZE: 120 KB |
| | | | 8-BIT GRAYSCALE MODE | DEGREE OF INFORMATION LOSS: 0 FILE SIZE: 300 KB |
| | | J0001-0002 | MONOCHROME BINARY MODE | DEGREE OF INFORMATION LOSS: 40 FILE SIZE: 15 KB |
| | | | 3-BIT GRAYSCALE MODE | DEGREE OF INFORMATION LOSS: 10 FILE SIZE: 80 KB |
| | | | 8-BIT GRAYSCALE MODE | DEGREE OF INFORMATION LOSS: 0 FILE SIZE: 140 KB |
| ⋮ | ⋮ | ⋮ | ⋮ | ⋮ |

FIG. 5

| JOB ID | EXPIRATION DATE AND TIME | PASSWORD | IMAGE DATA ID | EVALUATION VALUE BY OUTPUT MODE FOR DISPLAY | | | ACQUISITION SOURCE |
|---|---|---|---|---|---|---|---|
| | | | | OUTPUT MODE | EVALUATION VALUE | APPROPRIATENESS | |
| J0001 | SEPTEMBER 9, 2019 09:30:00 | abc123 | J0001-0001 | MONOCHROME BINARY MODE | DEGREE OF INFORMATION LOSS: LARGE FILE SIZE: 30 KB | LOW | ¥¥192.168.0.99¥shared¥j0001-0001-1.jpg |
| | | | | 3-BIT GRAYSCALE MODE | DEGREE OF INFORMATION LOSS: SMALL FILE SIZE: 120 KB | HIGH | ¥¥192.168.0.99¥shared¥j0001-0001-2.jpg |
| | | | | 8-BIT GRAYSCALE MODE | DEGREE OF INFORMATION LOSS: SMALL FILE SIZE: 300 KB | MEDIUM | ¥¥192.168.0.99¥shared¥j0001-0001-3.jpg |
| | | | J0001-0002 | MONOCHROME BINARY MODE | DEGREE OF INFORMATION LOSS: MEDIUM FILE SIZE: 15 KB | MEDIUM | ¥¥192.168.0.99¥shared¥j0001-0002-1.jpg |
| | | | | 3-BIT GRAYSCALE MODE | DEGREE OF INFORMATION LOSS: SMALL FILE SIZE: 80 KB | HIGH | ¥¥192.168.0.99¥shared¥j0001-0002-2.jpg |
| | | | | 8-BIT GRAYSCALE MODE | DEGREE OF INFORMATION LOSS: SMALL FILE SIZE: 140 KB | MEDIUM | ¥¥192.168.0.99¥shared¥j0001-0002-3.jpg |
| | | | ... | ... | ... | ... | ... |
| ... | ... | ... | | | | | |

FIG. 13

| OUTPUT MODE | THUMBNAIL IMAGE | APPROPRIATENESS | DEGREE OF INFORMATION LOSS | FILE SIZE | |
|---|---|---|---|---|---|
| MONOCHROME BINARY OUTPUT | | LOW | LARGE | 30 kByte | REACQUIRE |
| 3-BIT GRAYSCALE OUTPUT | | HIGH | SMALL | 120 kByte | REACQUIRE |
| ...... | ...... | ...... | ...... | ...... | ...... |
| 8-BIT GRAYSCALE OUTPUT | | MEDIUM | SMALL | 300 kByte | REACQUIRE |

[PAGE] 1/20   PREVIOUS PAGE   NEXT PAGE

IMAGE READING DATE AND TIME: 2019/09/02 09:30:00
IMAGE REACQUISITION DEADLINE: 2019/09/09 09:30:00
PASSWORD: abc123

WHEN YOU CLICK [REACQUIRE] BUTTON, DOWNLOAD OF OUTPUT RESULT IMAGE OF CORRESPONDING OUTPUT MODE WILL START (PASSWORD REQUIRED)

FIG. 17

| NO. | MONOCHROME BINARY MODE | 3-BIT GRAYSCALE MODE | ...... | 8-BIT GRAYSCALE MODE |
|---|---|---|---|---|
| 001 | E200 | | ....... | |

[PAGE] 1/20  PREVIOUS PAGE  RETURN TO MODE SELECTION SCREEN  NEXT PAGE

SYSTEM AND IMAGE PROCESSING DEVICE WITH EVALUATION VALUE INDICATION

BACKGROUND OF THE INVENTION

Field of the Invention

The present invention relates to a system.

Description of the Background Art

In recent years, digital image processing systems have achieved remarkable development, and the construction of a digital image processing technology is in progress. For example, in the fields of copying machines, multi-function printers (MFPs) using an electrophotographic system or an inkjet system, and the like, a document manuscript is read by a scanner and stored as a document file being electronic data, or the stored document file is managed. In addition, the document file is compressed and sent by e-mail.

Recently, the use of MFPs equipped with an automatic document feeder (ADF) is widespread. By setting the document to be read in the ADF, the user can cause the scanner provided in the MFP to automatically convey the document in a sequence, and read the images one side at a time. With such an MFP, it is possible to reduce the burden on the user, such as resetting the surface to be read by the MFP on the platen each time the document is scanned.

On the other hand, if the user sets, in the ADF, a plurality of documents having different attributes and causes the MFP to read the documents under the same settings, low-quality reading results or excessively high-quality reading results may possibly be obtained in some of the documents. For example, if documents printed in full color and documents printed in a monochrome binary mode are mixed, then if all documents are read as monochrome binary images or grayscale images, the color information may be lost in the documents printed in full color, causing the characters and photographs to appear blurred. Also, if a document having only characters printed in black color on a white base sheet is read as a full-color image, originally unnecessary color information may be added, resulting in an enormous file size.

In view of the above situations, for example, there is disclosed an Auto Color Selection (ACS) technology for the detection of the presence or absence of a color from a read image and switching of processing according to the detection result, by an MFP. There is disclosed another technology in which an output method (output mode) for outputting a read image is determined by the MFP from a monochrome binary mode, an 8-bit grayscale (256 gradations) mode, and the like, if it is determined that the read image is a monochrome image having only achromatic colors without any chromatic colors.

For example, a technology is proposed to select, by a user, whether to use first encoding processing corresponding to multilevel image data or second encoding processing corresponding to binary mage data to encode images to be filed as monochrome images from among the images read by an MFP (for example, see Japanese Patent No. 4934015). According to the disclosed technology, it is possible for a user to display the images to be filed as monochrome images on a display in a list format, and to select, for each of the images specified by the user through an inputter, whether to output as a monochrome binary image or as a grayscale image.

Here, the information lost when an image read by the MFP is output is defined as information loss. The permissible degree and level of information loss differ depending on the user, and the output mode determined by the image forming apparatus may not be an appropriate output mode for the user. If the user does not determine that the image data is output in an appropriate output mode, the user must perform the reading operation again to confirm the image data when the image data is output in another output mode. The technique described in Japanese Patent No. 4934015 merely outputs the image data in an output mode determined by an image forming apparatus, and the state of the image data when the image data is output in another output mode cannot be grasped.

Japanese Patent No. 4934015 describes a technique of displaying a preview image when image data is output, on a display of an image forming apparatus, however, it is not possible to easily compare cases where a single image data is output in each of a plurality of output modes. Further, if the number of documents is large, there is a problem that the image forming apparatus is occupied for a long time to confirm the preview image of each document.

In view of the above-described problems, an object of the present invention is to provide a system or the like capable of displaying, on a terminal device, the evaluation information when image data is output in two or more types of output modes.

SUMMARY OF THE INVENTION

A first aspect for solving the above-described problems is a system including an image processing device connected to a transmission and reception device that communicates with an external device and a terminal device connected to a display device.

In the system, the image processing device includes
an evaluation value calculation processor that calculates, for each of two or more types of output modes, an evaluation value of output image data when image data is output in the output mode (for example, a controller 70 in FIG. 2 and step S104 in FIG. 7), and
an evaluation information transmitter that transmits evaluation information including information based on the evaluation value for each of the output modes, to the terminal device, via the transmission and reception device (for example, the controller 70 in FIG. 2 and step S114 in FIG. 7), and
the terminal device includes
a display controller that performs control of displaying, for each of the output modes, the information based on the evaluation value corresponding to the output mode, on the display device, if the evaluation information is received (for example, a controller 300 in FIG. 6 and step S154 in FIG. 10).

A second aspect is the system according to the first aspect in which the evaluation information includes, for each of the output modes, information relating to reacquisition of the corresponding output image data,
the terminal device further includes a reacquisition request transmitter that transmits, based on the information relating to reacquisition of the output image data, a request for reacquiring the output image data, to the image processing device (for example, the controller 300 in FIG. 6 and step S164 in FIG. 10), and
the image processing device further includes an output image data transmitter that transmits, if the request is received, the output image data corresponding to the received request, to the terminal device that has transmitted the request (for example, the controller 70 in FIG. 2 and steps S142 to S148 in FIG. 9).

A third aspect is the system according to the first or the second aspect in which the evaluation information includes a thumbnail image of the output image data for each of the output modes, and the display controller displays, for each of the output modes, the thumbnail image corresponding to the output mode (for example, the controller 300 in FIG. 6 and step S160 in FIG. 10).

A fourth aspect is the system according to any of the first through the third aspects in which the display controller displays, for each of the output modes, information indicating appropriateness of outputting in the output mode (for example, the controller 300 in FIG. 6 and step S156 in FIG. 10).

A fifth aspect is the system according to any of the first through the fourth aspects in which the image processing device further includes an identifier that identifies, for each of the output modes, a block having a large degree of information loss among blocks composed of one or a plurality of pixels of the image data (for example, the controller 70 in FIG. 2 and step S204 in FIG. 15), the evaluation information includes information indicating a block having a large degree of information loss, and the display controller displays, for each of the output modes, a block having a large degree of information loss (for example, the controller 300 in FIG. 6 and step S252 in FIG. 16).

A sixth aspect is the system according to any of the first through the fifth aspects in which the image processing device further includes an output mode determiner that determines, based on the evaluation value, which of the two or more types of output modes is the most appropriate as the output mode of the image data (for example, the controller 70 in FIG. 2 and step S302 in FIG. 19), and an output image data transmitter that transmits, to a device specified by a user, the output image data in the most appropriate output mode (for example, the controller 70 in FIG. 2 and step S304 in FIG. 19).

A seventh aspect is the system according to any of the first through the sixth aspects in which if a request for transmitting the evaluation information is received from the terminal device, the evaluation information transmitter transmits the evaluation information (for example, the controller 70 in FIG. 2 and steps S188 and S114 in FIG. 14).

An eighth aspect is the system according to any of the first through the seventh aspects in which the image processing device is connected to an input device that reads a document and inputs the document as image data (for example, the image input device 10 in FIG. 2).

A ninth aspect is an image processing device connected to a transmission and reception device that communicates with an external device, and the image processing device includes an evaluation value calculation processor that calculates, for each of two or more types of output modes, an evaluation value of output image data when image data is output in the output mode (for example, the controller 70 in FIG. 2 and step S104 in FIG. 7), and an evaluation information transmitter that transmits evaluation information including information based on the evaluation value for each of the output modes, to another device, via the transmission and reception device (for example, the controller 70 in FIG. 2 and step S114 in FIG. 7).

A tenth aspect is the image processing device according to the ninth aspect in which the evaluation information includes, for each of the output modes, information relating to reacquisition of the corresponding output image data, and the image processing device further includes an output image data transmitter that transmits, if a request based on the information relating to reacquisition of the output image data is received from the other device to which the evaluation information has been transmitted, the output image data corresponding to the received request, to the other device (for example, the controller 70 in FIG. 2 and steps S142 to S148 in FIG. 9).

According to the present invention, it is possible to display, on a terminal device, evaluation information when image data is output in each of two or more types of output modes.

BRIEF DESCRIPTION OF THE DRAWINGS

FIG. 3 is a diagram for describing a functional configuration of a first image processor and a second image processor according to the first embodiment;

FIG. 4 is a diagram for describing a data configuration of evaluation value information according to the first embodiment;

FIG. 5 is a diagram for describing a data configuration of report information according to the first embodiment;

FIG. 13 is a diagram illustrating an example of an operation according to the first embodiment;

FIG. 17 is a diagram illustrating an example of an operation according to the second embodiment;

DESCRIPTION OF THE PREFERRED EMBODIMENTS

Embodiments of the present invention will be described below with reference to the drawings. In the present embodiment, as an example, a system to which the present invention is applied will be described.

1. First Embodiment

1.1 Overall Configuration

Figure 1:
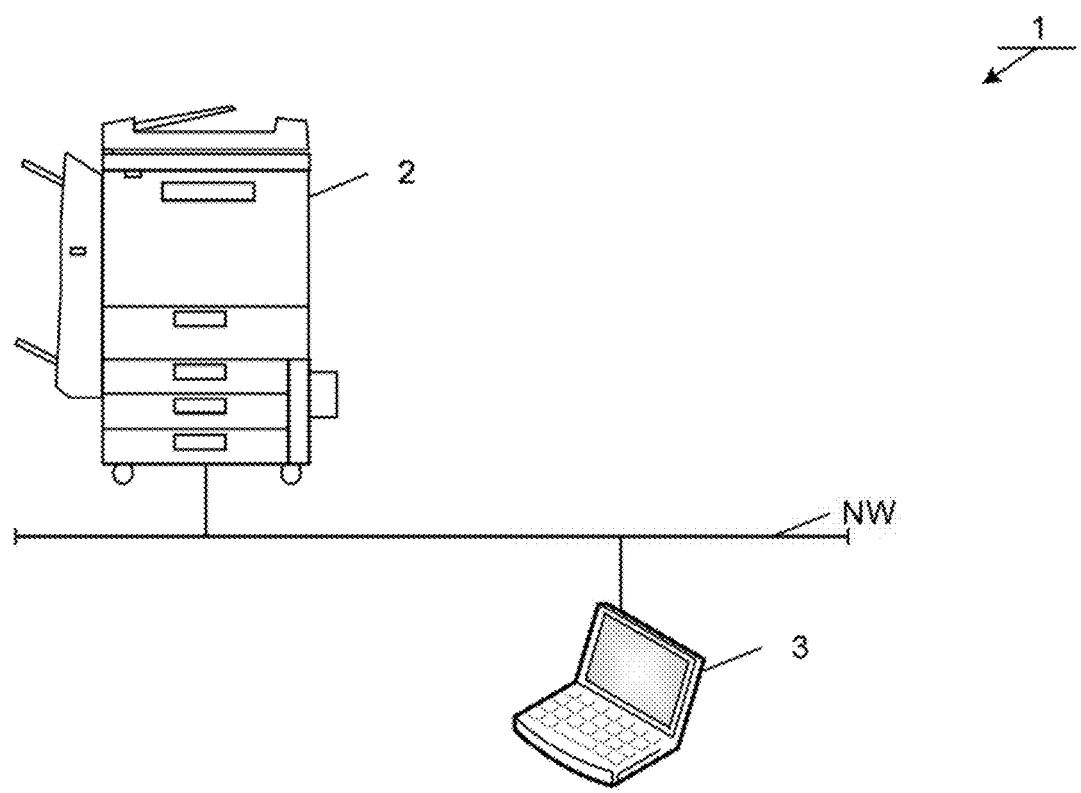
FIG. 1 is a diagram for describing an overall configuration of a system according to a first embodiment.

An overall configuration of a system 1 according to the present embodiment will be described with reference to FIG. 1. As illustrated in FIG. 1, the system 1 includes an image forming apparatus 2 and a terminal device 3, which are connected via a network NW. A Local Area Network (LAN) is assumed as the network NW, however, the network NW may be the Internet, for example.

The image forming apparatus 2 is an apparatus that outputs an image by forming an image of image data input from outside on a recording sheet (for example, a recording paper), and is a digital multifunctional apparatus having a color copy function, a color scanner function, and the like. The terminal device 3 is a device such as a personal computer (PC), a tablet, or a smartphone, and is a device used by a user of the image forming apparatus 2.

1.2 Functional Configuration

1.2.1 Image Forming Apparatus

Figure 2:
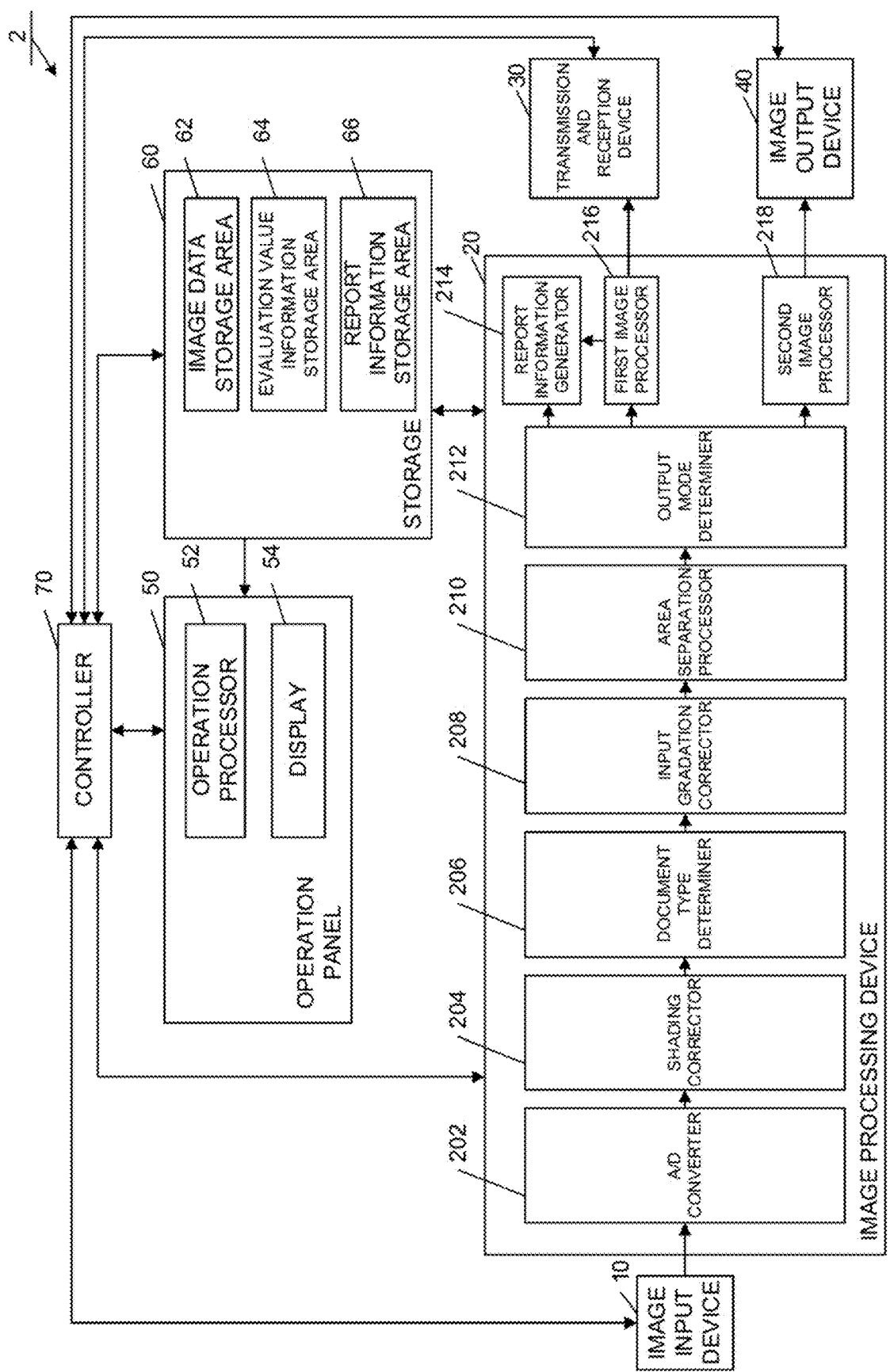
FIG. 2 is a diagram for describing a functional configuration of the image forming apparatus according to the first embodiment.

A functional configuration of the image forming apparatus 2 according to the first embodiment will be described with reference to FIG. 2. As illustrated in FIG. 2, the image forming apparatus 2 includes an image input device 10, an image processing device 20, a transmission and reception device 30, an image output device 40, an operation panel 50, a storage 60, and a controller 70.

Various processes executed in the image forming apparatus 2 are executed by causing the controller 70 to control the image input device 10, the image processing device 20, the transmission and reception device 30, the image output device 40, the operation panel 50, and the storage 60. The controller 70 includes, for example, a Central Processing Unit (CPU). The controller 70 performs data communication with computers, other digital multifunctional apparatuses, and the like connected to the network via a network card and LAN cable.

1.2.1.1 Image Input Device

The image input device 10 is a device that optically reads an image from a document. The image input device 10 processes the image data of the read image and outputs the processed image data. The image input device 10 includes, for example, a color scanner having a charge coupled device (CCD), and reads a reflected light image from a document as an RGB (R: red, G: green, B: blue) analog signal using the CCD.

The image processing device 20 is connected to the image input device 10. The image input device 10 outputs image data to the image processing device 20.

1.2.1.2 Image Processing Device

The image processing device 20 generates a compressed file from the image data output from the image input device 10, or generates image data of an image to be formed (output) on a recording sheet or the like.

The image processing device 20 generates image data composed of an RGB digital signal (hereinafter, referred to as "RGB signal") by executing image processes on the RGB analog signal input from the image input device 10 by an A/D converter 202, a shading corrector 204, a document type determiner 206, an input gradation corrector 208, an area separation processor 210, and an output mode determiner 212.

The A/D converter 202 receives an RGB analog signal input from the image input device 10 to the image processing device 20, and performs a process of converting the RGB analog signal into an RGB digital signal (that is, an RGB signal). The A/D converter 202 outputs the converted RGB signal to the shading corrector 204.

The shading corrector 204 performs a shading correction process on the RGB signal input from the A/D converter 202. An example of the shading correction performed by the shading corrector 204 includes a process of removing various distortions in the RGB signal generated in an illumination system, an image-formation system, and an imaging system of the image input device 10. Next, the shading corrector 204 outputs the RGB signal from which the distortions are removed, to the document type determiner 206.

The document type determiner 206 performs a document type discrimination process of discriminating the mode of a document such as a character, a photograph, or a photographic paper, using the RGB signal input from the shading corrector 204. The document type determiner 206 outputs the input RGB signal to the input gradation corrector 208. The processing result of the document type discrimination process is reflected in image processes in the subsequent processing operators.

The input gradation corrector 208 performs a process of correcting the gradation on the input RGB signal. The input gradation corrector 208 performs, for example, processes of adjusting color balance, removing background density, adjusting contrast, and the like for the process of correcting the gradation. Next, the input gradation corrector 208 outputs the processed RGB signal to the area separation processor 210.

The area separation processor 210 performs a process of separating pixels in the image represented by the RGB signal input from the input gradation corrector 208 into one of a character area, a halftone dot area, and a photograph area. The area separation processor 210 outputs, to a spatial filter processor 2004 and a gradation reproduction processor 2010 of the first image processor 216, an area identification signal indicating an area which each of the pixels belongs to, based on the separation result. Alternatively, the area separation processor 210 outputs the area identification signal to a black color generation and under color removal section 2104, a spatial filter processor 2106, and a gradation reproduction processor 2110 of the second image processor 218. Further, the area separation processor 210 outputs the RGB signal input from the input gradation corrector 208 to the output mode determiner 212.

The output mode determiner 212 performs the following processing on the image based on the RGB signal input from the area separation processor 210.

(1) ACS Determination Process

A process of determining whether to output a push image as a color image including chromatic colors or as a monochrome image not including chromatic colors is performed, based on the RGB signal input from the area separation processor 210. In the present embodiment, the push image means an image input to the image processing device 20 via the image input device 10. A known method can be employed for the determination process.

(2) Evaluation Value Calculation Process

If it is determined in the ACS determination process that the image data is to be output as a monochrome image, evaluation values are calculated for the cases where the image is output in each of a plurality of output modes selectable by the user. An output mode refers to a mode associated with an output method including a setting of a color type and a gradation value used when image data is output. If a push image is to be output as a monochrome image, the following output modes can be selected by the user, for example.

(a) N-bit Grayscale Mode

In this mode, a color of one pixel is expressed by a 2 bits or more (such as 8 bits) of information amount for the K channel. In the present embodiment, the N-bit grayscale is also referred to as multilevel.

(b) Monochrome Binary Mode

In this mode, a color of one pixel is expressed by a 1 bit (two gradations) of information amount for the K channel.

In general, as an amount of information for expressing pixels included in image data decreases, the expressiveness reduces. For example, if 8-bit grayscale image data is output as monochrome binary image data, image data expressed in 256 gradations is output as two-gradation monochrome image data, and the halftone pixels become either white or black pixels. As a result, an outline shape of a character image may change, and the character may not be legible (blacked-out characters), or a character or a pattern expressed in halftone may change to white pixels and be invisible (overexposed). Thus, if the number of gradations expressing the image data decreases, the information that could originally be read can no longer be read, which results in information loss.

Here, in the present embodiment, it is assumed that the image forming apparatus 2 has two or more types of modes selectable by the user when the push image is output as a monochrome image. For example, the output mode may be of two types, namely the 8-bit grayscale mode and the monochrome binary mode, or may be of three types, namely the 8-bit grayscale mode, the 3-bit grayscale mode, and the monochrome binary mode. The types and number of modes selectable by the user when the push image is output as a monochrome image are determined in advance depending on the specifications or the settings such as the administrator and the like.

In the image forming apparatus 2, it is possible to select full color output mode as the output mode upon outputting the push image as a color image. The full color output mode is an output mode in which the color of one pixel is represented by, for example, 8 bits (256 gradations) of information amount for each of the R, G, and B channels.

(3) Output Mode Determination Process

The output mode determination process is a process of selecting one mode from the output modes that the user can select, based on the evaluation value calculated by the evaluation value calculation process, when the push image is to be output as a monochrome image.

In the present embodiment, the output mode for outputting the push image as a monochrome image is selected by the user. Therefore, in the present embodiment, the output mode determiner 212 executes the ACS determination process and the evaluation value calculation process, and does not execute the output mode determination process.

The output mode determiner 212 outputs the evaluation value calculated in the evaluation value calculation process to a report information generator 214, or stores the evaluation value in an evaluation value information storage area 64 as evaluation value information. Further, the output mode determiner 212 outputs the RGB signal input from the area separation processor 210 either to the first image processor 216 or the second image processor 218.

The report information generator 214 generates, based on the evaluation value output from the output mode determiner 212 or the evaluation value information read from the evaluation value information storage area 64, information (report information) necessary for the report to be transmitted to the terminal device 3. The report in the present embodiment is evaluation information for the user including information based on the evaluation value for each output mode, which is necessary for comparing cases where the image data is output in each of the output modes selectable by the user. The information to be included in the report may be determined in advance, or may be set by the administrator of the system 1 or the user, for example.

The report may include thumbnail images of the image data for the cases where the image data is output in each of the output modes to make it easier to compare the cases where the image data is output in each of the output modes selectable by the user. In this case, for example, the report information generator 214 acquires the image data generated by the first image processor 216 described later, and generates thumbnail images by changing the image data to a predetermined size (for example, a size in which the number of pixels in the vertical or horizontal direction is not more than 200). The report information generator 214 can include in the report the thumbnail images corresponding to the image data, for each of the output modes selectable by the user.

The first image processor 216 generates a compressed file (compressed image data), based on the RGB signal output by the output mode determiner 212, and outputs the compressed file to the transmission and reception device 30. The image processing device 20 may store the compressed file in the storage 60 before outputting the compressed file to the transmission and reception device 30.

The second image processor 218 generates, based on the RGB signal output by the output mode determiner 212, image data composed of CMYK (C: cyan, M: magenta, Y: yellow, K: black) digital signals, and outputs the image data to the image output device 40 as a stream. The image processing device 20 may store the generated image data in the storage 60 before outputting the generated image data to the image output device 40.

The first image processor 216 and the second image processor 218 will be described with reference to FIG. 3. First, the first image processor 216 will be described. As illustrated in FIG. 3, the first image processor 216 includes a color corrector 2002, the spatial filter processor 2004, a resolution conversion processor 2006, an output gradation corrector 2008, the gradation reproduction processor 2010, and a compression processor 2012.

The color corrector 2002 converts the RGB signal input from the output mode determiner 212 to a color-corrected RGB signal or a gray signal, and outputs the converted signal to the spatial filter processor 2004.

The spatial filter processor 2004 performs a spatial filter process by a digital filter on the RGB signal or gray signal input from the color corrector 2002, based on the area identification signal input from the area separation processor 210, and corrects the spatial frequency characteristics. Thus, image blur or graininess deterioration is improved. Next, the spatial filter processor 2004 outputs the processed RGB signal or gray signal to the resolution conversion processor 2006.

The resolution conversion processor 2006 performs a resolution conversion process so that the image data has the resolution set on the operation panel 50. For example, if the input resolution of the scanner is 600 DPI×300 DPI and the resolution selected by the user via the operation panel 50 is 300 DPI×300 DPI, the resolution conversion processor 2006 determines the average value for every two pixels in the main scanning direction, and sets the value as the output value. Thus, resolution conversion is executed from 600 DPI×300 DPI to 300 DPI×300 DPI. The resolution conversion processor 2006 outputs the processed RGB signal or gray signal to the output gradation corrector 2008.

The output gradation corrector 2008 performs output gradation correction on the RGB signal or the gray image input from the resolution conversion processor 2006 as necessary so that a fog or a background of highlight disappears or is thinner. The output gradation corrector 2008 outputs the RGB signal or gray signal that has been subjected to the output gradation correction process to the gradation reproduction processor 2010.

If the output mode is the monochrome binary mode, the gradation reproduction processor 2010 performs a binarization process on the RGB signal or the gray signal input from the output gradation corrector 2008, and outputs the processed RGB signal or gray signal to the compression processor 2012. If the output mode is not the monochrome binary mode, the gradation reproduction processor 2010 outputs the RGB signal or gray signal input from the output gradation corrector 2008 as is to the compression processor 2012.

The compression processor 2012 performs a compression process, if necessary, on the image data including the RGB signal, gray signal, or the monochrome binary signal input from the gradation reproduction processor 2010, in the Joint Photographic Experts Group (JPEG) format or in the Modified Modified Read (MMR) format according to the file format settings of the operation panel 50. The compression processor 2012 performs the compression process to generate compressed data, and then generate an image file (compressed file), and outputs to the transmission and reception device 30.

Next, the second image processor 218 will be described. As illustrated in FIG. 3, the second image processor 218 includes a color corrector 2102, the black color generation and under color removal section 2104, the spatial filter processor 2106, an output gradation corrector 2108, and the gradation reproduction processor 2110.

The color corrector 2102 converts the RGB signal input from the output mode determiner 212 into a CMY digital signal (hereinafter, referred to as a CMY signal). Further, the color corrector 2102 performs a process of achieving fidelity of color reproduction as a process of reproducing, by a CMY signal converted from the RGB signal, a color represented by a not converted RGB signal. For example, the color corrector 2102 performs a process of removing, from the CMY signal, color turbidity based on the spectral characteristics of CMY color materials including an unnecessary absorption component. Next, the color corrector 2102 outputs the color-corrected CMY signal to the black color generation and under color removal section 2104.

The black color generation and under color removal section 2104 performs a black color generation process of generating a black color (K) signal from the CMY signal, based on the CMY signal input from the color corrector 2102, and a process of subtracting the K signal obtained from the CMY signal in the black color generation process and generating a new CMY signal. As a result, the CMY digital signal having three colors is converted into a CMYK digital signal having four colors (hereinafter, referred to as "CMYK signal"). Next, the black color generation and under color removal section 2104 outputs the CMYK signal obtained by converting the CMY signal, to the spatial filter processor 2106.

A method of generating black color by skeleton black is typically employed for the black color generation process. In this method, data C', M', Y', and K' to be output is obtained from input data C, M, and Y. Here, if it is assumed that the input/output characteristics of the skeleton curve are y=f(x), and the Under Color Removal (UCR) rate is α (0<α<1), then in the black color generation and under color removal process, equations represented by the following equations (1) to (4) are used to convert the CMY signal into the CMYK signal.

$$K'=f(\min(C,M,Y)) \quad (1)$$

$$C'=C-\alpha K' \quad (2)$$

$$M'=M-\alpha K' \quad (3)$$

$$Y'=Y-\alpha K' \quad (4)$$

Here, the UCR rate α (0<α<1) indicates how much the CMY is reduced by replacing, with K, a portion where the CMY overlaps. Equation (1) indicates that the K signal is generated according to the smallest signal strength among strengths of the C signal, the M signal, and the Y signal.

The spatial filter processor 2106 performs a process of improving the image blur or graininess deterioration on the image data of the CMYK signal input from the black color generation and under color removal section 2104. Specifically, the spatial filter processor 2106 performs a spatial filter process by a digital filter, based on the area identification signal input from the area separation processor 210, and corrects a spatial frequency characteristic. For example, the spatial filter processor 2106 performs a spatial filter process on an area separated as the character area by the area separation processor 210, using a filter with a large enhancement amount of a high-frequency component, to improve the reproducibility of the characters. The spatial filter processor 2106 performs a low-pass filter process of removing an input halftone dot component on an area as the halftone dot area separated by the area separation processor 210. Next, the spatial filter processor 2106 outputs the processed CMYK signal to the output gradation corrector 2108.

The output gradation corrector 2108 performs an output gradation correction process on the CMYK signal input from the spatial filter processor 2106, based on the characteristic halftone dot area ratio of the image output device 40, and outputs the CMYK signal after the output gradation correction process to the gradation reproduction processor 2110.

The gradation reproduction processor 2110 performs a halftone process in accordance with the area, based on the area identification signal input from the area separation processor 210. For example, the gradation reproduction processor 2110 performs a binarization or multilevel conversion process on an area as the character area separated by the area separation processor 210, using a high-resolution screen suitable for reproducing high-frequency components. The gradation reproduction processor 2110 performs a binarization or multilevel conversion process on an area as the halftone dots area separated by the area separation processor 210, using a screen emphasizing gradation reproduction. Next, the gradation reproduction processor 2110 outputs image data based on the processed CMYK signal to the image output device 40.

In the above explanation, the processes of each processing operator in the image processing device 20 is executed by causing the controller 70 to control the processing operators, but the processes may be executed by controlling the processing operators by a computer including a processor such as a Digital Signal Processor (DSP).

1.2.1.3 Transmission Device

A transmission and reception device 30 that transmits a compressed file generated by the image processing device 20 to the outside is connected to the image processing device 20. The transmission and reception device 30 can be connected to a communication network such as a public network, a LAN, or the Internet, and transmits the compressed file to the outside via a communication network by a communication method such as facsimile or e-mail. For example, if a Scan to e-mail mode is selected by the user on the operation panel 50, the transmission and reception device 30 formed of a network card, a modem, or the like attaches the compressed file to an e-mail and transmits the compressed file to a set destination.

In facsimile transmission, the controller 70 performs a procedure for communication with the other party, in the transmission and reception device 30 formed of a modem. When it is ensured that the facsimile transmission is enabled, the controller 70 performs a necessary process on the compressed file, such as a process of changing a compression format, and then performs a process of sequentially transmitting the file to the other party via a communication line.

The transmission and reception device 30 may receive a compressed file from another device by a communication method such as facsimile. For example, in facsimile reception, the controller 70 receives a compressed file transmitted from the other party and inputs the received compressed file to the image processing device 20 while performing a communication procedure in the transmission and reception device 30. The image processing device 20 performs a decompression process on the received compressed file, and if necessary, performs a rotation process and/or a resolution conversion process or the like on the image data of the image obtained by the decompression process. Further, the image processing device 20 performs various image processes on the image data in the second image processor 218 and outputs the image data to the image output device 40. The image output device 40 forms an output image on a recording sheet, based on the output image data.

1.2.1.4 Image Output Device

The image output device 40 that outputs an image based on the generated image data is connected to the image processing device 20. The image output device 40 forms and outputs an image on a recording sheet, based on the image data input from the image processing device 20, by using a thermal transfer system, an electrophotography system, or an inkjet system.

1.2.1.5 Operation Panel

The controller 70 is connected to the operation panel 50. The operation panel 50 is provided with an operation processor 52 including hard keys such as numeric keys and a setting button for setting an operation mode and the like of the image forming apparatus 2 by a user; and a display 54 including a device such as a liquid crystal display, or an organic EL display. The operation panel 50 may be a touch panel in which the operation processor 52 and the display 54 are integrally formed. In this case, a method of detecting an input on the touch panel may be a common detection method such as a resistive method, touch screen technology utilizing infrared or electromagnetic induction, or a capacitive method.

1.2.1.6 Storage

The storage 60 is connected to the image processing device 20. The storage 60 is a functional element that stores various data such as image data and various programs, and includes, for example, a non-volatile storage device (for example, a hard disk drive (HDD)), or a semiconductor memory storage device (for example, a solid state drive (SSD)), or the like.

In the present embodiment, an image data storage area 62, the evaluation value information storage area 64, and a report information storage area 66 are secured in the storage 60.

The image data storage area 62 stores the image data of an image read by the image input device 10, the image data generated by the image processing device 20, and the image data of an image obtained by decompressing a compressed file received by the transmission and reception device 30. In the present embodiment, the image data stored in the image data storage area 62 will be described as being identified by an image data ID.

The evaluation value information storage area 64 stores the evaluation value information. As illustrated in FIG. 4, the evaluation value information in the present embodiment includes a job ID (for example, "J0001"), a reading date and time indicating a date and time when the reading of an image is started (for example, "Sep. 2, 2019 09:30:00"), a push image data ID (for example, "J0001-0001") for identifying the data of a push image (push image data) stored in the image data storage area 62, and an evaluation value by output mode. The evaluation value by output mode includes, for each of the output modes, an output mode (for example, "Monochrome binary mode") and the evaluation value when the push image is output in the output mode (for example, "Degree of information loss: 90, File size: 30 KB").

Here, a job means a unit of processing executed by the image processing device 20 from the user's point of view. In the present embodiment, when a user sets a plurality of documents in an ADF and executes the reading process, the process of reading all the documents set in the ADF is defined as one job.

The report information storage area 66 stores report information. As illustrated in FIG. 5, the evaluation value information in the present embodiment includes a job ID (for example, "J0001"), an expiration date and time until which the push image can be reacquired (for example, "Sep. 9, 2019 09:30:00"), a password for authenticating the user that performs reacquisition of the push image (for example, "abc123"), a push image data ID (for example, "J0001-0001"), and an evaluation value by output mode for display and the acquisition source for each output mode. For the convenience of explanation, the password is written in alphanumeric characters, but of course, in consideration of security, the password can be managed by a highly confidential method through encryption.

Here, in the present embodiment, as the report information, in addition to the evaluation value by output mode for display, which is the information based on the evaluation value for each output mode, the information related to the reacquisition of the push image for each output mode (the password, the expiration date and time, and the acquisition source in the example in FIG. 5) is included. Reacquisition means that the user acquires a push image after the report is transmitted to the terminal device 3 by the image forming apparatus 2. The information related to reacquisition includes information related to constraints on reacquisition, such as information for identifying the push image acquired by the user, for example, the acquisition source; and information related to security and the operation of the storage 60 of the image forming apparatus 2, for example, the password and the expiration date and time. For example, if the user is not satisfied with the output image data, the push image may be acquired again. Even in such a case, the user refers to the report, determines in which output mode to perform reacquisition, based on the evaluation value by output mode for display, and then can transmit a request for reacquisition from the terminal device 3 to the image forming apparatus 2 in accordance with the information related to reacquisition. The image forming apparatus 2 outputs a push image based on the request for reacquisition. By doing so, for example, the user can output the push image in the output mode selected by himself/herself, then refer to the report and output the push image again in another output mode.

The evaluation value by output mode for display is information on the evaluation value to be displayed on the terminal device 3, and is information on the evaluation value confirmed by the user. In the present embodiment, the evaluation value by output mode for display includes an output mode (for example, "Monochrome binary mode"), an evaluation value when the push image is output in the output mode (for example, "Degree of information loss: Large, File size: 30 KB"), and information on the appropriateness of outputting in the output mode (for example, "Low") are included.

The acquisition source indicates a location (download destination) where image data (output image data) when the push image is output in a predetermined output mode is stored. For example, the acquisition source stores a file path or URL (Uniform Resource Locator) that can be used for identifying the location where the image file when the push image is output in an output mode selectable by the user is stored.

1.2.2 Terminal Device

Figure 6:
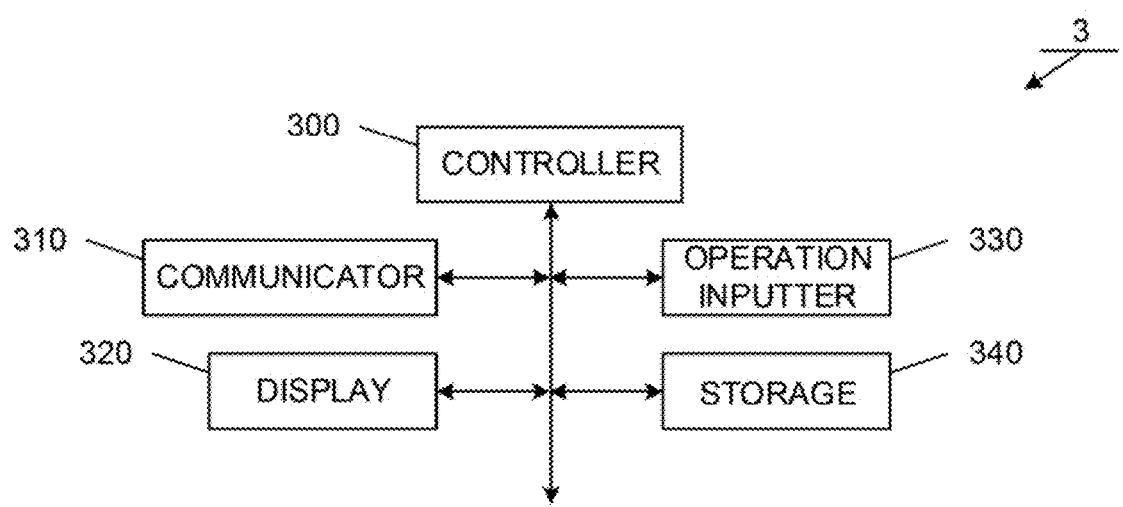
FIG. 6 is a diagram for describing a functional configuration of a terminal device according to the first embodiment.

A functional configuration of the terminal device 3 according to the first embodiment will be described with reference to FIG. 6. As illustrated in FIG. 6, the terminal device 3 includes a controller 300, a communicator 310, a display 320, an operation inputter 330, and a storage 340.

The controller 300 is a functional element for controlling the terminal device 3, and includes, for example, one or more arithmetic devices (CPUs).

The communicator 310 is a functional element for the terminal device 3 to communicate with the image processing device 20 being an external device, and includes, for example, a Network Interface Card (NIC) used in a wired/wireless LAN.

The display 320 is a functional element that displays various types of information to the user, and includes, for example, a Liquid Crystal Display (LCD), an organic Electro-Luminescence (EL) panel, or the like.

The operation inputter 330 is a functional element for the user to perform various operations, and includes, for example, a keyboard and a mouse.

The storage 340 is a functional element for storing various programs and various data necessary for the operation of the terminal device 3, and includes, for example, an SSD being a semiconductor memory, an HDD, or the like.

1.3 Process Flow 1.3.1 Image Forming Apparatus

The processing of the image forming apparatus 2 executed by causing the controller 70 to read out the program stored in the storage 60 and to control the image input device 10, the image processing device 20, and the transmission and reception device 30 will be described with reference to figures. In the present embodiment, the controller 70 executes the main process and the reacquisition process.

In the description of the processing flow, it is assumed that the image forming apparatus 2 has two or more types of output modes selectable by the user when the push image is output as a monochrome image. Also, the terminal device 3 will be described as being a terminal device used by a user who causes the image forming apparatus 2 to read an image.

1.3.1.1 Main Process

Figure 7:
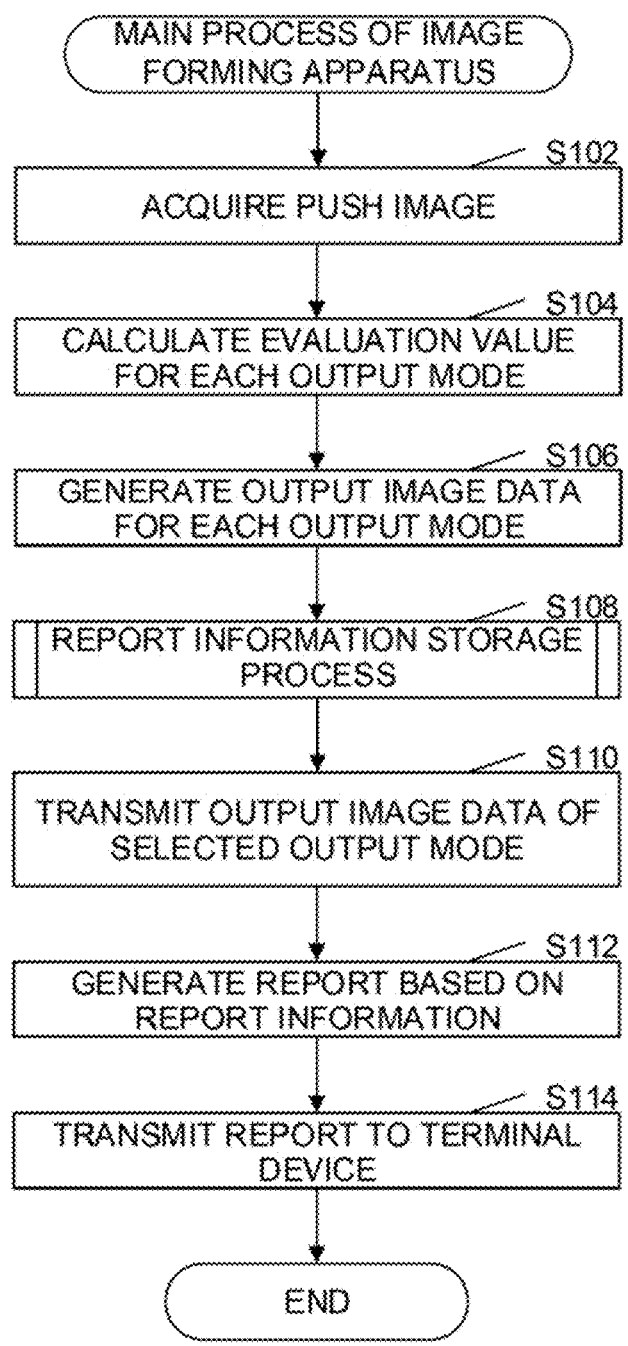
FIG. 7 is a flowchart illustrating a flow of a main process of the image forming apparatus according to the first embodiment.

First, the main process will be described with reference to FIG. 7. The main process is a process of acquiring a push image and transmitting a report based on the acquired push image to the terminal device 3. First, the controller 70 acquires one or more push images (step S102). For example, the controller 70 acquires image data as a push image from the image input device 10.

After acquiring the push image, the controller 70 reads one or more push images for which image data is output from the image input device 10, controls the A/D converter 202, the shading corrector 204, the document type determiner 206, the input gradation corrector 208, and the area separation processor 210 to execute each process. The controller 70 stores the processed image data in the image data storage area 62.

The controller 70 processes one or more push images, and performs the process of storing the processed image data in the image data storage area 62 as one reading job. At this time, the controller 70 sets a job ID.

If the push image is acquired, the controller 70 controls the output mode determiner 212, executes the ACS determination process, and if it is determined that the push image is to be output as a monochrome image, the controller 70 calculates the evaluation value for each output mode selectable by the user (step S102; Yes→step S104).

The following are calculated as the evaluation value.

(1) Degree of Information Loss

The output mode determiner 212 selects one output mode from the output modes selectable by the user, and quantitatively evaluates the degree of information loss when output is performed in the selected output mode.

For a specific method of quantitatively evaluating the degree of information loss, for example, the description will be provided by setting an output mode in which the degree of information loss is evaluated quantitatively as a target mode (here, the monochrome binary output mode), and setting an output mode being a comparison target as a reference mode (here, the grayscale output mode). It is desirable that the reference mode is an output mode in which information loss is unlikely to occur. For example, the reference mode is set to be the grayscale output mode in advance.

Firstly, the output mode determiner 212 calculates a spatial edge amount for each pixel of an image for evaluation corresponding to the target mode, and generates a target edge image. Similarly, the output mode determiner 212 generates a reference edge image having a spatial edge amount for each pixel of an image for evaluation corresponding to the reference mode. For example, a method of calculating the spatial edge amount by applying a high-pass filter such as a Sobel filter for each pixel may be employed.

It is desirable that the image for evaluation is the output image data generated by executing the processing of the first image processor, however, this may result in design problems such as a long processing time, sharing of hardware, and the like. Therefore, the image for evaluation may be an image obtained by simulating the image when a push image is output in the output mode, by a process such as executing a simple image process. For example, some of the plurality of processes included in the main image processes may be omitted, or a simplified process may be performed, such as reducing the size of a filter used in the spatial filter processor 2004. Alternatively, the processing amount for generating the display image may be reduced by reducing the push image in advance, for example.

Next, the output mode determiner 212 calculates, for each pixel, a lost edge amount being an edge amount lost as a result of outputting the image in the target mode. Regarding the lost edge amount, for example, by using a method in which the target edge image is subtracted from the reference edge image for each pixel and a negative number is changed to zero, only the edge amount lost in the target edge image can be taken into consideration.

The output mode determiner 212 calculates an evaluation value taking a larger value as the degree of information loss increases, by using the lost edge amounts. For example, as the evaluation value, the sum of the lost edge amount in a part or the entire area of the push image can be used as the evaluation value of the output mode that is a target of quantitative evaluation of the degree of information loss. The controller 70 may compare the lost edge amount with a predetermined threshold value for each pixel, and count the number of pixels taking an edge amount equal to or greater than the threshold value as the evaluation value.

(2) File Size

The output mode determiner 212 generates an image for evaluation for each output mode and measures the file size. The image for evaluation may be erased after the file size is measured, and therefore, the storage 60 need not be occupied for a long time.

If there are a plurality of push images, the output mode determiner 212 calculates the evaluation value for each push image. The output mode determiner 212 stores the evaluation value information including the calculated evaluation value in the evaluation value information storage area 64. At this time, the output mode determiner 212 uses the evaluation value calculated for each output mode as the evaluation value information by output mode, and generates evaluation value information including the push image data ID for identifying the push image data for which the evaluation value is to be calculated. The output mode determiner 212 includes the job ID set in step S102 and the date and time when the reading job is started (the reading date and time) in the evaluation value information.

Subsequently, the controller 70 controls the first image processor 216, and based on the image data output from the output mode determiner 212, generates the output image data for each output mode selectable by the user, via the first image processor 216 (step S106). Then, the controller 70 stores the output image data generated by the first image processor 216 in the image data storage area 62. At this time, the controller 70 stores the generated output image data in an area that requires authentication by a password or the like, when acquiring the generated output image data from an external device such as the terminal device 3. If the image for evaluation is generated by executing the processing of the first image processor in step S104, the controller 70 may store the image for evaluation as is in the image data storage area 62. The output image data may be stored in an external device such as a network attached storage (NAS) or the like (for example, a shared folder).

Figure 8:
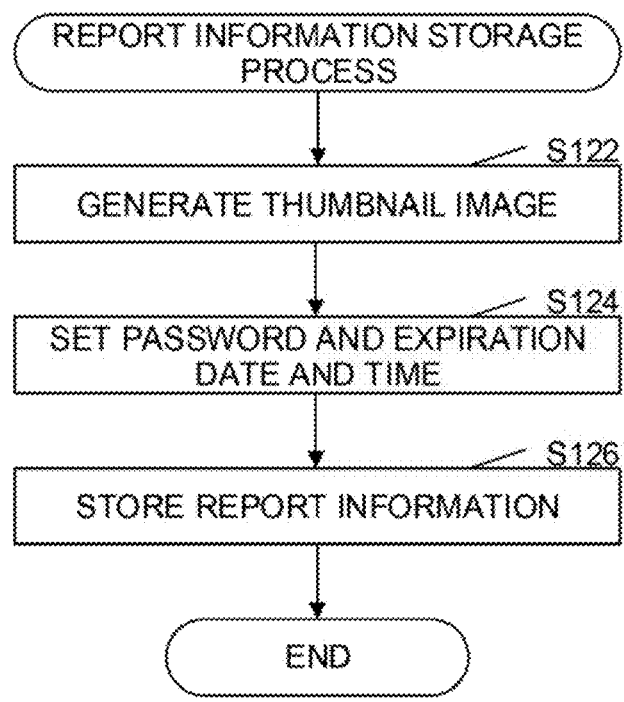
FIG. 8 is a flowchart illustrating a flow of a report information storage process according to the first embodiment.

Subsequently, the controller 70 controls the report information generator 214 to execute the report information storage process (step S108). The report information storage process will be described with reference to FIG. 8.

First, the report information generator 214 generates thumbnail images (step S122). The report information generator 214 generates, for example, the following thumbnail images as the thumbnail images:

(1) Thumbnail images of the push image
(2) Thumbnail images of the output image data The report information generator 214 generates the thumbnail images, based on the purpose of the report to be transmitted to the terminal device 3 and the content to be displayed in the report. For example, the report may be one in which the thumbnail image of the push image and the thumbnail images of the output image data are displayed, or one in which only the thumbnail images of the output image data are displayed. Alternatively, if there are many output modes selectable by the user, or if the data size of the report to be transmitted to the terminal device 3 should be reduced, the report may be one that displays only the thumbnail image of the push image. In this case, the user viewing the thumbnail image of the push image can recognize which page of the image data having multiple pages read as a result of the user's operation corresponds to the information based on the evaluation value for each output mode, he/she is viewing. Then, the user can infer the state when the push image is output in each output mode, from the information based on the evaluation value. In this way, the report information generator 214 generates the thumbnail images according to the purpose of the report and the like. If the thumbnail images are not to be displayed in the report, step S122 may be omitted.

The report information generator 214 generates the thumbnail images by reading the image data acquired and stored in step S102 and the image data generated and stored in step S106 from the image data storage area 62, for example, and reducing the images based on the read image data. The report information generator 214 may generate the thumbnail images by acquiring the image data of the push image and the output image data from the first image processor 216, and reducing the images based on the acquired image data. The report information generator 214 stores the generated thumbnail images in the image data storage area 62.

Subsequently, the report information generator 214 sets the password that is required to authenticate the user if the user reacquires the output image data and the expiration date and time until which the output image data can be reacquired (step S124).

Subsequently, the report information generator 214 generates the report information and stores the report information in the report information storage area 66 (step S126). The report information includes a job ID, an expiration date and time, a password, an image data ID, an evaluation value by output mode for display, and an acquisition source.

As the evaluation value by output mode for display, the report information generator 214 may store the same information as the evaluation value by output mode stored in the evaluation value information, or the information obtained by scoring and classifying the evaluation value at several levels. For example, the evaluation value indicating the degree of information loss may be expressed by a class (for example, any one of large, medium, and small) indicating the degree of information loss. In this way, by storing information on the score and class based on the evaluation value in the report information by the report information generator 214, even if it is difficult for the user to recognize the specific state of the output image data based on the evaluation value, the user can recognize the state of the output image data to some extent.

Further, the report information generator 214 determines and stores the information on appropriateness to be stored in the evaluation value by output mode for display, based on the evaluation value by output mode stored in the evaluation value information. In determining the appropriateness, for example, the report information generator 214 calculates a score based on one or more evaluation values, and determines which region of a plurality of classes (ranges of values) obtained by dividing using a plurality of threshold values the calculated score is included in.

In a case where the appropriateness is determined based on a plurality of evaluation values, the report information generator 214 may calculate the score by weighting and summing the scores of the respective evaluation values. The weighted value (ratio) for each evaluation value may be set by the user or may be set in advance.

The appropriateness class is, for example, a high, medium, or low class. The appropriateness may be expressed by ranking in order of increasing appropriateness, such as "1, 2, . . . ", based on the evaluation value and score.

In the acquisition source, for example, information is stored that enables the identification of the location where the output image data generated in step S106 is stored.

Returning to FIG. 7, the controller 70 controls the transmission and reception device 30 to transmit the output image data of the output mode selected by the user (step S110). The transmission destination of the output image data is specified by the user. The controller 70 transmits the output image data to the device identified based on the transmission destination specified by the user.

For example, if an e-mail address is specified as a transmission destination by a user, the controller 70 generates an e-mail to which the output image data is attached, and controls the transmission and reception device 30 to send the e-mail to an e-mail server (the so-called Scan to e-mail function). If the terminal device 3 is specified as the transmission destination by the user, the controller 70 controls the transmission and reception device 30 to transmit the output image data to the terminal device 3. If it is instructed by the user to transmit the output image data to an external device such as a NAS or the like, the controller 70 controls the transmission and reception device 30 to transmit the output image data to the specified external device.

Subsequently, the controller 70 reads the report information from the report information storage area 66 and generates a report based on the report information (step S112). For example, the controller 70 reads the report information, and generates an e-mail with the read report information as the main body, or generates an e-mail to which a file (for example, a Portable Document Format (PDF)) describing the read report information is attached. As a result of such processing, the controller 70 generates a report including the evaluation value by output mode for display and the information related to reacquisition (for example, a password, an expiration date and time, and an acquisition source). The report may include a job ID and an image data ID. Further, the controller 70 may read the evaluation value information identified by the job ID from the evaluation value information storage area 64, and include the reading date and time stored in the read evaluation value information in the report.

Subsequently, the controller 70 transmits the report generated in step S112 to the terminal device 3 (step S114). The controller 70 may attach a thumbnail image of the push image, or a thumbnail image of the output image data for each output mode to the e-mail.

1.3.1.2 Reacquisition Process

Figure 9:
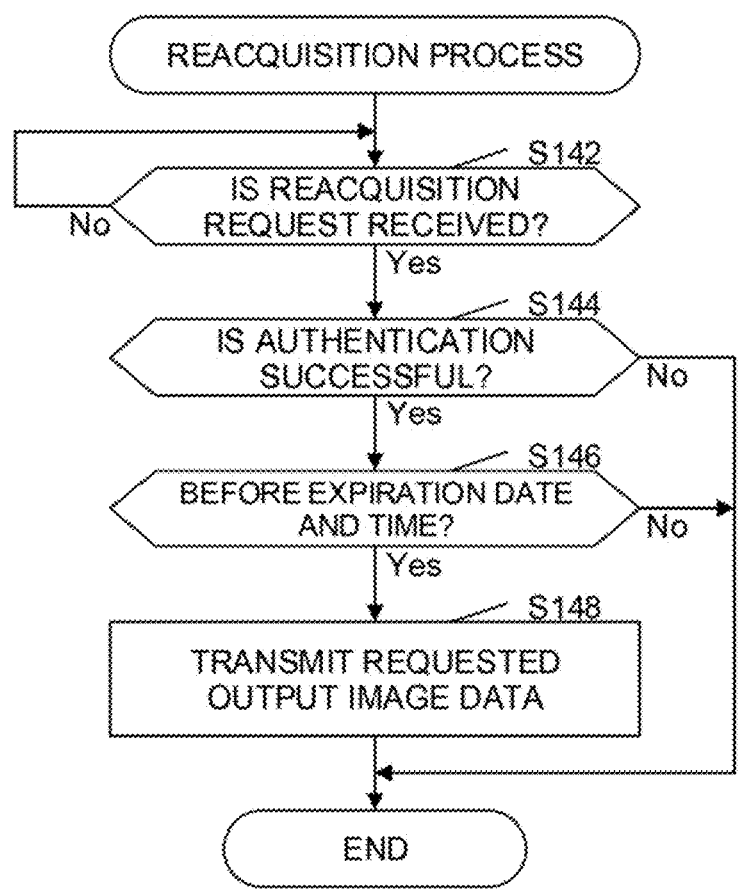
FIG. 9 is a flowchart illustrating a flow of a reacquisition process according to the first embodiment.

The reacquisition process will be described with reference to FIG. 9. The reacquisition process is a process in which, if a user requests reacquisition via the terminal device 3, a push image based on the request (output image data when a push image is output in the specified output mode) is transmitted to a predetermined transmission destination. The image forming apparatus 2 executes the reacquisition process separately (in parallel) from the main process.

First, the controller 70 determines whether a reacquisition request is received from the terminal device 3 via the transmission and reception device 30 (step S142). Receiving a reacquisition request means that a user requests acquisition (transmission) of the output image data when the push image is output in the output mode specified by the user. Specifically, this is a case where the acquisition source is accessed, or a case where information including information for identifying the output image data is received. The information for identifying the output image data is, for example, a combination of the image data ID and the output mode, information on the acquisition source, a combination of the job ID, the page number, and the output mode, and the like. If a reacquisition request is not received (step S142; No), the controller 70 continues to execute step S142 until the reacquisition request is received, and waits until the reacquisition request is received from the terminal device 3.

If a reacquisition request is received, the controller 70 requests a password for reacquiring the output image data, to the terminal device 3 that has transmitted the reacquisition request, and performs authentication of whether the reacquisition request is transmitted by a user capable of reacquiring the output image data (step S142; Yes→step S144). In the present embodiment, the controller 70 requests input of a password to the terminal device 3, and determines the authentication as successful if the password transmitted from the terminal device 3 matches the password stored in any of the report information.

If the authentication is successful, the controller 70 determines whether the current date and time is before the expiration date and time until which the output image data can be reacquired (step S144; Yes→step S146). If the current date and time is before the expiration date and time, the controller 70 reads the output image data requested by the user from the image data storage area 62, based on the reacquisition request, and transmits the data to the terminal device 3 that has transmitted the reacquisition request, via the transmission and reception device 30 (step S146; Yes→step S148).

The transmission method of the output image data may be not a download format but a format for accepting a request for retransmission of the output image data (a retransmission request format). The retransmission of output image data means that the output image data is transmitted via e-mail by the Scan to e-mail function, or is transmitted to an external device such as NAS. In this case, the reacquisition request also includes information indicating the transmission destination of the output image data.

In this case, when the controller 70 receives the reacquisition request including the information for identifying the output image data, the controller 70 executes a job for transmitting the output image data corresponding to the information included in the reacquisition request to the transmission destination. In this case, the output image data corresponding to the information included in the reacquisition request is transmitted to an e-mail server, NAS, or the like instead of the terminal device 3 that has transmitted the reacquisition request.

1.3.2 Terminal Device

The main process of the terminal device 3 will be described with reference to FIG. 10. The main process of the terminal device 3 is executed by causing the controller 300 to read a program stored in the storage 340.

First, the controller 300 determines whether a report is received from the image forming apparatus 2 (step S152). If a report is received, the controller 300 displays the content of the report, based on the received report. Specifically, the controller 300, based on the evaluation value by output mode for display included in the report, displays, for each output mode, the information based on the evaluation value on the display 320 (step S154), and displays, for each output mode, the appropriateness of output on the display 320 (step S156). The controller 300 further displays a reacquisition request means on the display 320, based on the information related to reacquisition of the push image for each output mode (step S158). The reacquisition request means is for transmitting a reacquisition request to the image forming apparatus 2 in response to an operation such as selection by the user. For example, the controller 300 displays a button or characters in which a link to the acquisition source is set, on the display 320. In addition to displaying the reacquisition request means, the controller 300 displays, on the display 320, the password required for authenticating the user who performs the reacquisition and the expiration date and time from the information related to reacquisition. At this time, if the current date and time is past the expiration date and time, the controller 300 may hide the reacquisition request means or may display the reacquisition request means in an inactive state on the display 320, or hide the password.

If the report includes a thumbnail image, the controller 300 displays the thumbnail image on the display 320 (step S160). In step S114, if the image forming apparatus 2 transmits the report by an e-mail, the controller 300 displays the report if the user performs an operation of displaying the e-mail containing the report as the content.

Subsequently, in a case where reacquisition of the output image data is requested by the user, the controller 300 transmits a reacquisition request to the image forming apparatus 2 via the communicator 310 (step S162; Yes→step s164). The case where a reacquisition is requested is, for example, a case where the reacquisition request means displayed on the display 320 in step S158 is operated. The reacquisition request includes information for identifying the output image data for which a reacquisition is requested (for example, information on the acquisition source and information combining an image data ID and an output mode), and information on the transmission destination. After transmitting a reacquisition request, the controller 300 receives a request for the input of a password, from the image forming apparatus 2. At this time, input of the password is accepted from the user, and the input password is transmitted to the image forming apparatus 2. If the authentication by the image forming apparatus 2 is successful, the output image data is transmitted to the terminal device 3 or the transmission destination included in the reacquisition request, based on the reacquisition request.

1.4 Operation Example

Figure 11:
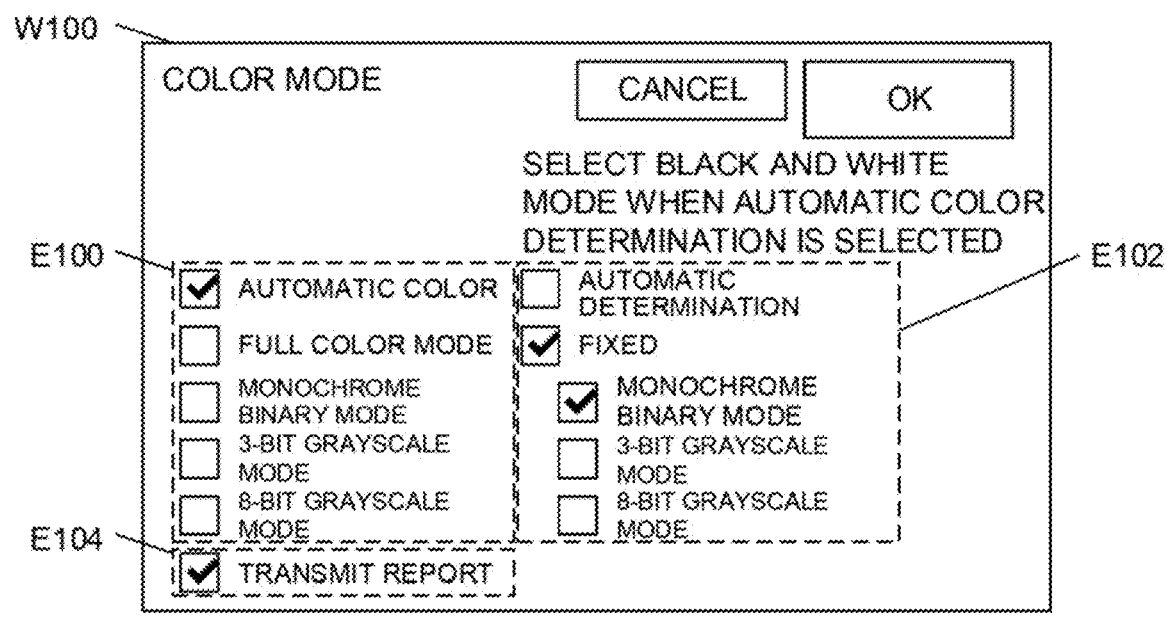
FIG. 11 is a diagram illustrating an example of an operation according to the first embodiment.
Figure 12:
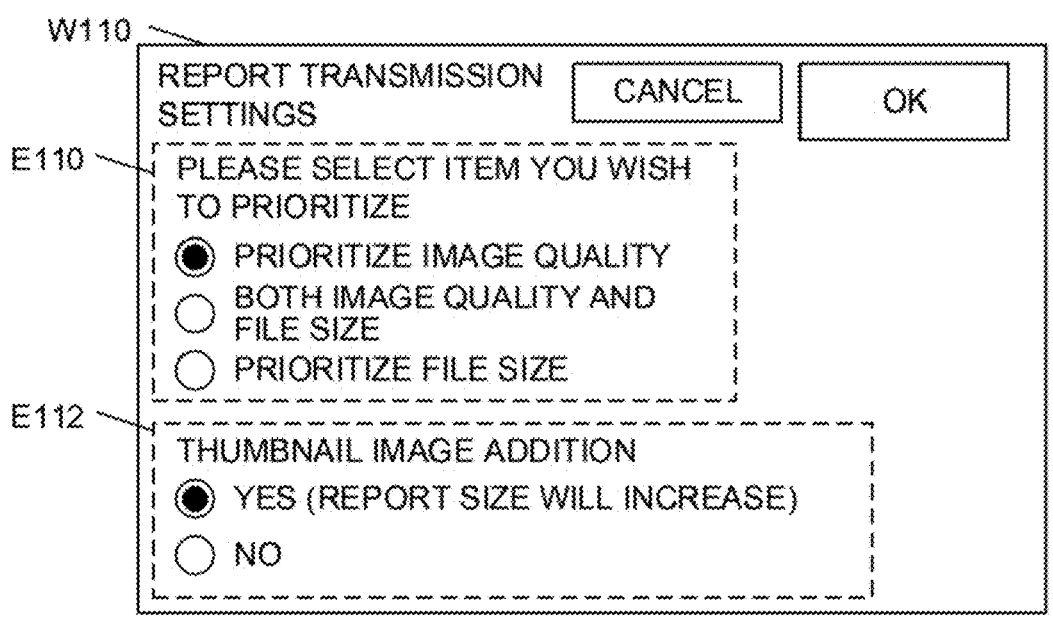
FIG. 12 is a diagram illustrating an example of an operation according to the first embodiment.

An operation example of the present embodiment will be described with reference to the figures. FIGS. 11 and 12 are diagrams illustrating examples of the display screen displayed on the display 54 of the image forming apparatus 2 before the processing of reading the document by the image input device 10 is performed.

FIG. 11 is an example of a display screen W100 displayed on the display 54 of the image forming apparatus 2 before the execution of the reading job. The display screen W100 includes areas E100 and E102 for specifying the output mode of the push image. The area E100 is for specifying whether to perform the ACS determination process, and the area E102 is for specifying the output mode when it is determined by the ACS determination process that the push image is to be output as a monochrome image. In the example in FIG. 11, it is specified that the ACS determination process is enabled and if the ACS determination process determines that the push image is to be output as a monochrome image, the monochrome binary mode is used as an output mode. The display screen W100 includes an area E104 for specifying whether to send a report. If the transmission of a report is specified, the image forming apparatus 2 transmits a report to the terminal device 3.

FIG. 12 is an example of a display screen W110 displayed on the display 54 of the image forming apparatus 2 when settings related to the report to be transmitted are made. The display screen W110 includes an area E110 for specifying the evaluation value to be handled as important factor in calculating the appropriateness.

As illustrated in FIG. 12, in the area E110, any one of the "Prioritize image quality", "Prioritize file size", and "Both image quality and file size" can be selected. Based on the specification of the evaluation value to be handled as important factor in calculating the appropriateness, that is performed by the user, the image forming apparatus 2 calculates a comprehensive evaluation value (score) obtained by combining, in a predetermined balanced manner, the evaluation value derived from the information loss and the evaluation value derived from the file size, to determine the appropriateness. For example, if "Prioritize image quality" is selected, the image forming apparatus 2 increases the weight (ratio) of the evaluation value obtained from the magnitude of the degree of information loss. On the other hand, if "Prioritize file size" is selected, the image forming apparatus 2 increases the weight of the evaluation value obtained from the measured value (predicted value) of the file size. If "Both image quality and file size" is selected, the image forming apparatus 2 sets the weight of each evaluation value to be an intermediate weight between the above-described two weights.

FIG. 12 depicts a display example in which the weight setting can be selected from three types, however, for example, the weight may be specified in small units for each type of evaluation value. It may be possible to select determination of appropriateness from one of the evaluation values, such as only the evaluation value derived from the information loss or only the evaluation value derived from the file size.

The screen for making the settings related to the report to be transmitted may include settings of the content to be included in the report and the like, for example, an area for specifying whether to transmit the thumbnail image, as illustrated as the area E112 in FIG. 12.

FIG. 13 is a diagram illustrating an example of a display screen W120 of a report that is displayed on the display 320 of the terminal device 3. The report includes the reading date and time the push image, the image reacquisition deadline (expiration date and time) indicating the date and time until which reacquisition is possible, and the password. In addition, thumbnail images of the output image data, appropriateness, and evaluation values for each output mode are also included. By viewing the report displayed on the display 320 of the terminal device 3, the user can confirm, for one push image, the evaluation value, appropriateness, and thumbnail image of each of the two or more types of output modes.

If a plurality of push images are acquired in one reading job, the report includes a previous page button B120 and a next page button B122 for selecting one push image. That is, the terminal device 3 handles the plurality of push images as images of a plurality of pages. If the user selects the previous page button B120 and the next page button B122, the terminal device 3 displays the thumbnail image of the output image data, appropriateness, and evaluation value for each output mode of the push image corresponding to the specified page.

The report further includes a reacquisition button B124 for requesting reacquisition for each output mode. For example, the reacquisition button B124 is a button for acquiring the output image data when the push image of the first page is output in the monochrome binary output mode. If the user selects the reacquisition button B124, the reacquisition request is transmitted from the terminal device 3 to the image forming apparatus 2, and the output image data is transmitted from the image forming apparatus 2 to the terminal device 3. Instead of requesting reacquisition in units of pages, a reacquisition request spanning a plurality of pages may be collectively transmitted, and the output image data spanning the plurality of pages may be transmitted to a predetermined destination as a single transmission job. After the reacquisition button B124 is selected, a screen for inquiring the transmission destination of the output image data to be reacquired may be displayed. In this case, the output image data is transmitted to the transmission destination specified by the user.

Although, in the main process of the image forming apparatus 2 according to the present embodiment, a report is generated after generating the output image data and the transmission of the report is performed at the same timing as the transmission of the output image data, the processing need not be as described above. The report does not have to be transmitted by e-mail. Other examples of the present embodiment will be described below.

Figure 14:
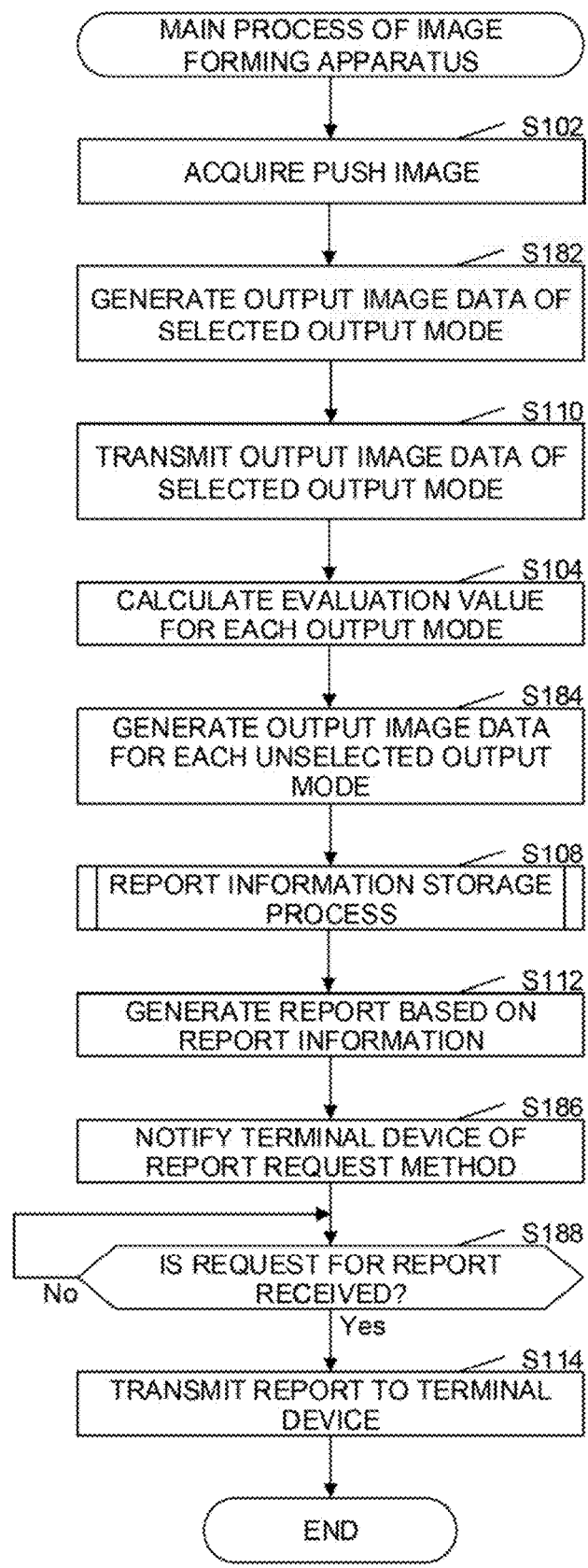
FIG. 14 is a flowchart illustrating a flow of a main process of the image forming apparatus according to Example 1 of the first embodiment.

(1) Example 1: Example in which the Report is Transmitted after the Transmission of Output Image Data The image forming apparatus 2 may transmit, at timing when transmission of the report becomes executable after the transmission of the output image data based on an operation by the user, the report to the terminal device 3 after inquiring the user whether to request for the transmission of the report. FIG. 14 illustrates the main process of the image forming apparatus 2 in this case. After acquiring the push image, the controller 70 generates the output image data of the output mode selected by the user, and transmits the output image data of the output mode selected by the user (step S102→step S182→step S110). After transmitting the output image data, the controller 70 calculates the evaluation value for each output mode (step S104). The controller 70 generates output image data that is not selected by the user (step S184). The controller 70 stores the generated output image data in the image data storage area 62. After executing the report information storage process in step S108 and the process of generating a report in step S112, the controller 70 notifies the terminal device 3 of a report request method (step S186). If a request for a report based on the report request method notified to the terminal device 3 is received from the terminal device 3, the controller 70 transmits the report to the terminal device 3 that has transmitted the request for a report (step S188; Yes→step S114). By performing the processing in such an order, the output image data (image file of the output image) is transmitted before the information included in the report is generated, and thus the waiting time of the user can be reduced.

That is, the controller 70 transmits the report upon being instructed by the user to transmit the report. In this case, the controller 70 generates the output image data of the output mode selected by the user in step S182, and then transmits the output image data in step S110. In step S186, the controller 70 transmits, to the terminal device 3, a mini-report describing a transmission method of an instruction for transmitting a report, and if the transmission method is executed, the controller 70 may transmit the report to the terminal device 3. The mini-report may be an e-mail that simply presents options such as "Request an evaluation" and "Do not request an evaluation". In this case, if the controller 70 receives, from the terminal device 3, an e-mail including a response result from the user, the controller 70 may determine whether to transmit the report according to the response result.

Steps S186 and S188 may be skipped, and the report may be transmitted when it becomes possible to transmit the report. In this case, the mini-report or the like is not transmitted, and the report is transmitted after the output image data is transmitted.

(2) Example 2: Example in which Output Image Data is Generated as Needed

In step S106, the controller 70 generates only the output image data of the output mode selected by the user. If a reacquisition request is received from the user, the controller 70 generates the output image data corresponding to the reacquisition request, from a push image. Example 2 is effective if a sufficient storage capacity cannot be secured in the storage 60. In this case, in step S126 of the report information storage process, the report information generator 214 may store in advance, as the acquisition source, the storage destination of the output image data generated when the reacquisition request is received, or may not store the acquisition source.

(3) Example 3: Example in which a Report is Viewed with a Web Browser

The controller 70 may store the data necessary for displaying the report in the storage 60, and if the report is accessed from the terminal device 3, the controller 70 may read the report from the storage 60 and transmits to the terminal device 3. In this case, the controller 70 generates a file in which the report is described in a markup language such as HyperText Markup Language (HTML), and stores the file in the storage 60. Then, in step S114, the controller 70 transmits a link for the file generated in step S112 to the terminal device 3. By connecting to the link destination provided in the received file via the Web browser, the terminal device 3 accesses the storage 60 of the image forming apparatus 2, and displays the data stored in the storage 60 on the Web browser.

The image forming apparatus 2 may provide a Web application that enables the acquisition of the report information by the terminal device 3, and also enables, if the terminal device 3 acquires the report information, dynamic rewriting of the display content, based on the acquired information. In this case, the terminal device 3 displays the Web application on the Web browser. By executing the Web application, the terminal device 3 acquires the report information through the Web application, and draws the acquired report information on the Web application using Javascript (registered trademark) or the like.

As a result of the processing based on the Web application or the markup language, the terminal device 3 can draw the image on the Web browser displayed on the display 320 while reducing or cropping the image. The image forming apparatus 2 can omit the process of generating thumbnail images and reduce the amount of information to be stored in the storage 60.

(4) Example 4: Example in which Authentication Associated with the User is Performed In the description provided in the above-described embodiment, the controller 70 stores the output image data in an area that requires authentication by a password or the like, and thus associates the output image data with the authentication information such as the password, however, user authentication may also be performed by associating the output image data with the user. In this case, the image forming apparatus 2 performs authentication by password authentication, biometric authentication, or the like before usage by the user, and stores the user who executes the job. In this case, if a reacquisition request is received and the user who executed the job of reading the push image of the output image data to be reacquired and the user who requests the reacquisition are the same, the controller 70 determines that the authentication is successful and transmits the output image data.

As long as the image forming apparatus 2 is can transmit a report to the terminal device 3, receive a reacquisition request from the terminal device 3, and transmit image data based on the reacquisition request, the order of the steps may be changed, or some of the steps may be omitted within a consistent range.

Figure 10:
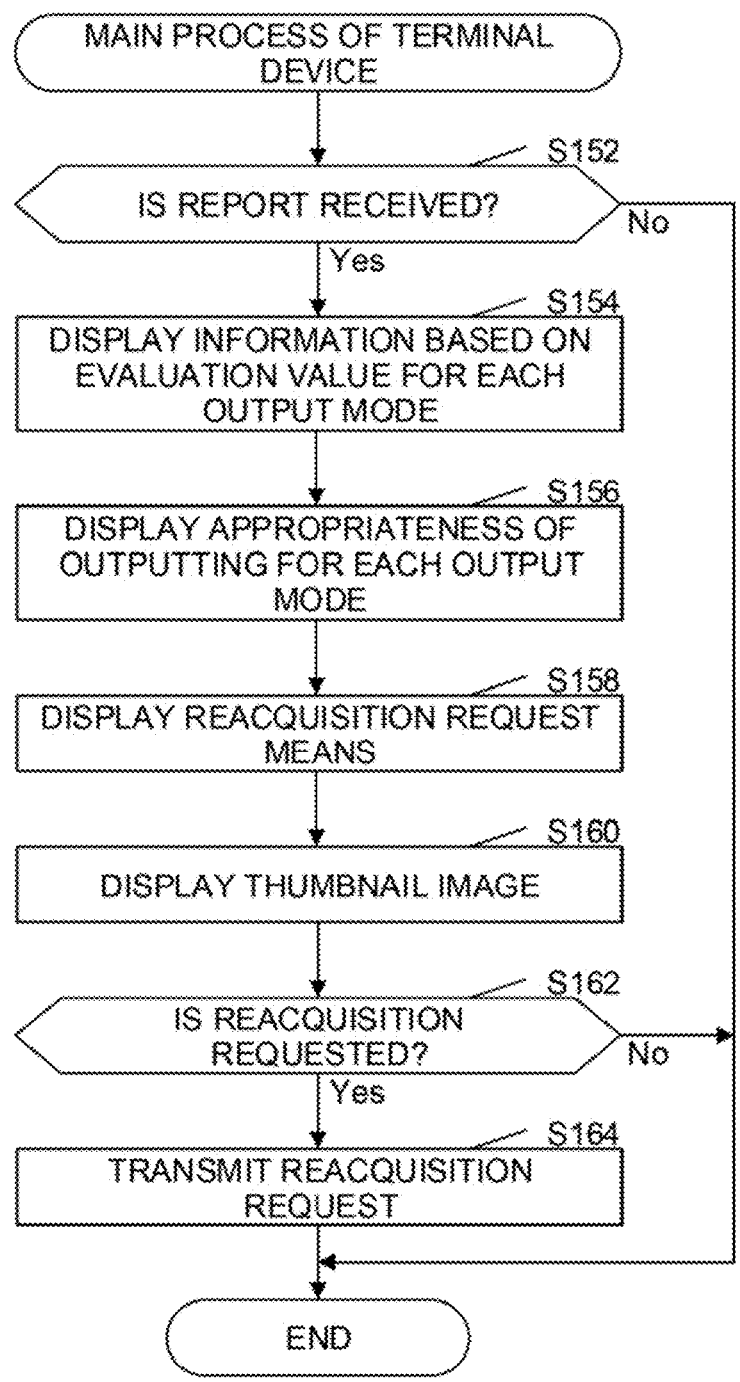
FIG. 10 is a flowchart illustrating a flow of a main process of a terminal device according to the first embodiment.

For example, regarding the processing in steps S154 to S160 in the main process of the terminal device 3 in FIG. 10, the controller 300 of the terminal device 3 may change the order of the steps to be executed, or may execute some processes in parallel.

If an example including viewing with the Web browser in Example 3 is implemented, the thumbnail images to be displayed on the Web browser may not be generated in advance, but may be displayed by using the images converted by the first image processor 216, for example. In this case, step S122 of the report information storage process can be omitted. A functional element that executes a predetermined process may be changed from the functional element described in the present embodiment within a consistent range. For example, in the present embodiment, it has been described that the controller 70 executes the process of creating a report and transmitting the report to the terminal device 3 in steps S112 and S114, but the creation of the report and the transmission of the report to the terminal device 3 may be executed by the report information generator 214. Regarding step S126 of the report information storage process, it has been described that the report information generator 214 of the image forming apparatus 2 determines appropriateness of outputting, but the determination may be performed by the terminal device 3 upon displaying the report and the appropriateness may be displayed.

According to the present embodiment, the image forming apparatus transmits, to the terminal device, a report including information on the evaluation values and the appropriateness when the output is performed in an output mode selectable by the user. Further, based on the received report, the terminal device displays the information on the evaluation values and the appropriateness when the output is performed in an output mode selectable by the user. As a result, if the user is dissatisfied with the image file output in the selected output mode, the user can save the trouble of operating the image forming apparatus and re-reading the image file by him/herself, and can grasp in advance the other risks that occur when output is performed in another output mode. Therefore, the user does not need to reacquire the image data over and over again. The report contains information related to reacquisition, and the terminal device displays the reacquisition request means, because of which the user can perform reacquisition by a simple operation of selecting the reacquisition request means even if reacquisition is necessary.

Instead of selecting the output mode on the spot while looking at the display of the image forming apparatus, the user can select the output mode while looking at the report displayed on the terminal device used by the user. Therefore, even if there are many push images, the user can avoid occupying the image forming apparatus for a long time, and can take as much time as he/she needs to consider the output mode while looking at the display of the terminal device. The evaluation values and thumbnail images for each output mode are displayed in the report, and therefore, the user can easily compare the cases of output in each output mode.

2. Second Embodiment

Next, a second embodiment will be described. The second embodiment is an embodiment in which, in the main process of the image processing device according to the first embodiment, a process of calculating the degree of information loss for each block is further performed on the output image data for each output mode. In the present embodiment, FIG. 7 of the first embodiment is replaced with FIG. 15, and FIG. 10 of the first embodiment is replaced with FIG. 16, respectively. The same numeral or symbol is attached to the same functional element and process, and description thereof is omitted.

Figure 15:
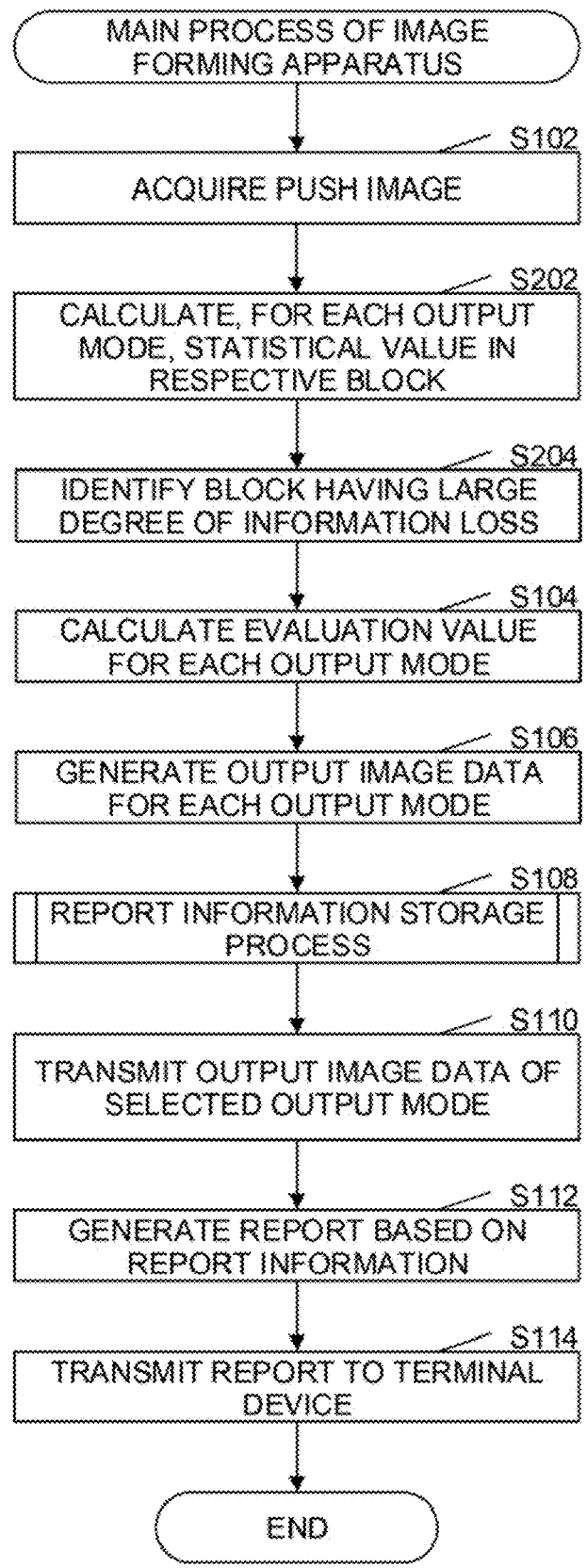
FIG. 15 is a flowchart illustrating a flow of a main process of an image forming apparatus according to a second embodiment.

With reference to FIG. 15, the main process of the image forming apparatus 2 in the present embodiment will be described. In the present embodiment, after acquiring the push image, the controller 70 divides the output image data of the push image into areas (pixel blocks) composed of a plurality of pixels, for each output mode, and calculates the statistical value in the respective pixel block (step S202). For example, the controller 70 calculates the variance of the lost edge amount and the statistic of the lost edge amount based on the entropy value, in each pixel block composed of a plurality of pixels constituting an image of the output image data.

Typically, if information loss is large, an information loss evaluation value expressed as a differential value being a gradation value of differential image data calculated between the image output in the target mode and the image output in the reference mode, or an absolute value of the differential value tends to be large as a whole. Therefore, it is possible to use a statistical value reflecting the overall magnitude of the gradation value, for the statistical amount. Specifically, it is possible to use a sum (total value), an average value, a median value, and the like of the gradation value of each of pixels of the entire differential image data. If information loss is large, the information loss evaluation value expressed as a differential value being a gradation value or a variation in the differential value as a whole tends to be large. Therefore, it is possible to use a statistical value reflecting the magnitude of the variation in the gradation value, for the statistical amount. Specifically, it is possible to use a variance value, a standard deviation value, and entropy value and the like of the gradation value of each of pixels of the entire differential image data.

Subsequently, the controller 70 identifies the pixel block having a large degree of information loss, based on the statistic of the lost edge amount in the pixel block (step S204). That is, a pixel block having a large degree of information loss indicates a place where information loss is likely to occur.

For example, the controller 70 compares the statistical value for each pixel block with a predetermined threshold value, and extracts as one object adjacent areas forming a single mass with statistics exceeding the threshold value. The controller 70 uses the number of areas constituting the object, or the like as a score for determining whether the area is a location where information loss is likely to occur, and if the score is above a threshold value, the controller 70 identifies the area as a location where information loss is likely to occur. A threshold value to be compared with the statistical amount or the score may be predetermined, or may be set by the user.

In the present embodiment, in step S126 of the report information storage process, information indicating a block having a large degree of information loss is stored in the report information. In step S122 of the report information storage process, along with generating a thumbnail image for each output mode, the report information generator 214 may generate an image (heat map) indicating a location where information loss is likely to occur for each output mode. In this case, in step S114, the controller 70 includes the heat map in the report and transmits the report to the terminal device 3. In the terminal device 3, by displaying the thumbnail image and the heat map in a switchable manner, or by displaying the thumbnail image and the heat map in an overlapping manner, the user may be enabled to visually recognize the locations where information loss is likely to occur.

In step S122 of the report information storage process, the report information generator 214 may generate two types of partial images for each output mode, namely a partial image of an area determined as an area where information loss is likely to occur, and a partial image of the push image corresponding to the area. If there are a plurality of areas determined as an area where information loss is likely to occur, the two types of partial images are generated for each of the plurality of areas. In step S114, the controller 70 transmits the partial image generated by the report information generator 214. By doing so, the user compares the partial image of the area determined as an area where information loss is likely to occur with the partial image corresponding to the area in the push image, and can confirm the degree of information loss.

In step S126 of the report information storage process, the report information generator 214 may determine the appropriateness according to the distribution of the statistical values for each pixel block.

Figure 16:
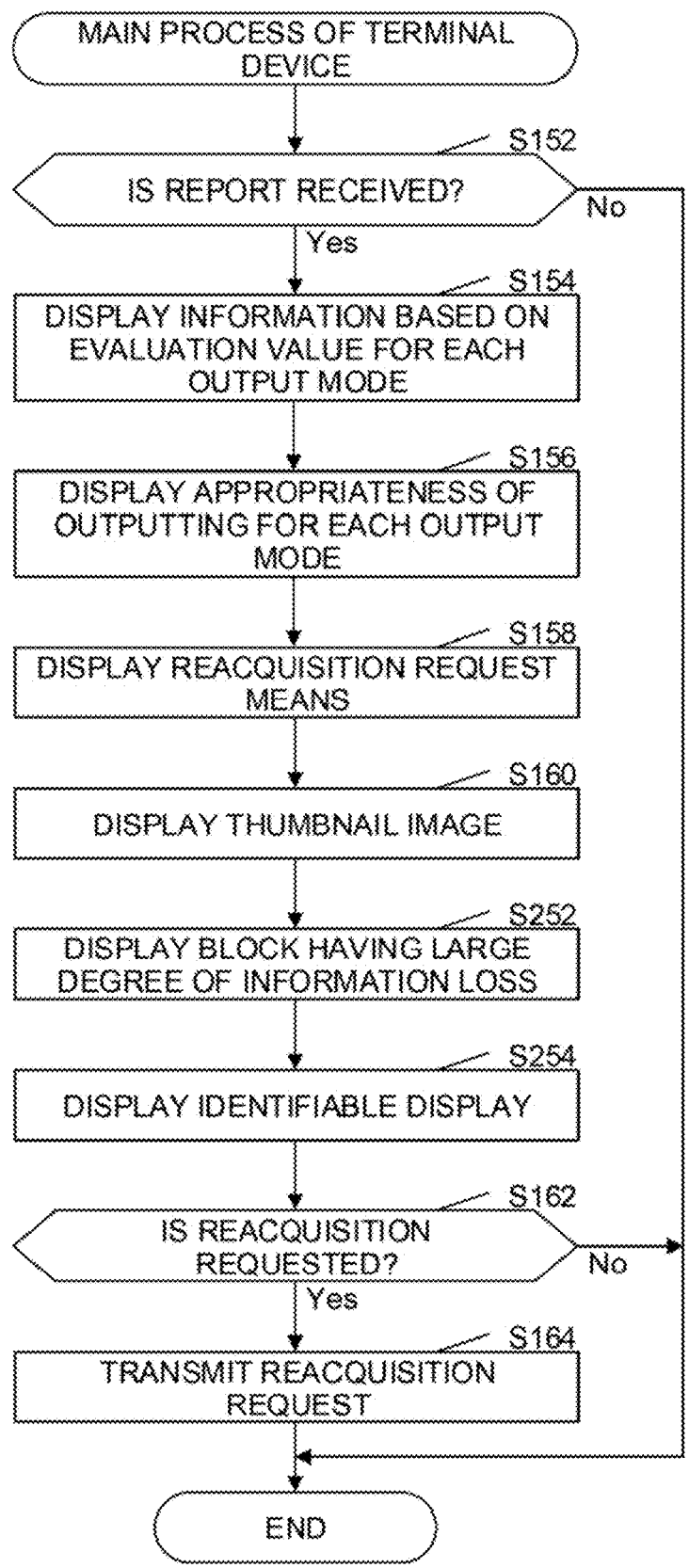
FIG. 16 is a flowchart illustrating a flow of a main process of the terminal device according to the second embodiment.

Subsequently, the main process of the terminal device 3 will be described with reference to FIG. 16. In the present embodiment, if it is determined that a report is received, the controller 300 of the terminal device 3 displays, based on the report, the evaluation value, the appropriateness of outputting, the reacquisition request means, and the thumbnail image for each output mode, on the display 320, similar to the first embodiment. Then, the controller 300 displays a block having a large degree of information loss on the display 320 (step S252). For example, the controller 300 displays the position of a block having a large degree of information loss by characters, or superimposes a display indicating the position of a block having a large degree of information loss on a thumbnail image or a partial image. If the report includes a heat map, the controller 300 may display the thumbnail image and the heat map in a switchable manner, or may display the thumbnail image and the heat map in an overlapping manner. If the report includes two types of partial images, namely a partial image of an area determined as an area where information loss is likely to occur, and a partial image of a push image corresponding to the area, the controller 300 may display the two types of partial images side by side.

The controller 300 displays, on the display 320, an identifiable display (for example, an icon indicating alert) indicating that it is determined that information loss is likely to occur (step S254). For example, if the controller 300 displays the heat map and the partial image in step S252, the controller 300 displays an identifiable display around the position of the block having a large degree of information loss, or displays an identifiable display near the name of the output mode determined as a mode in which information loss is likely to occur.

Figure 18:
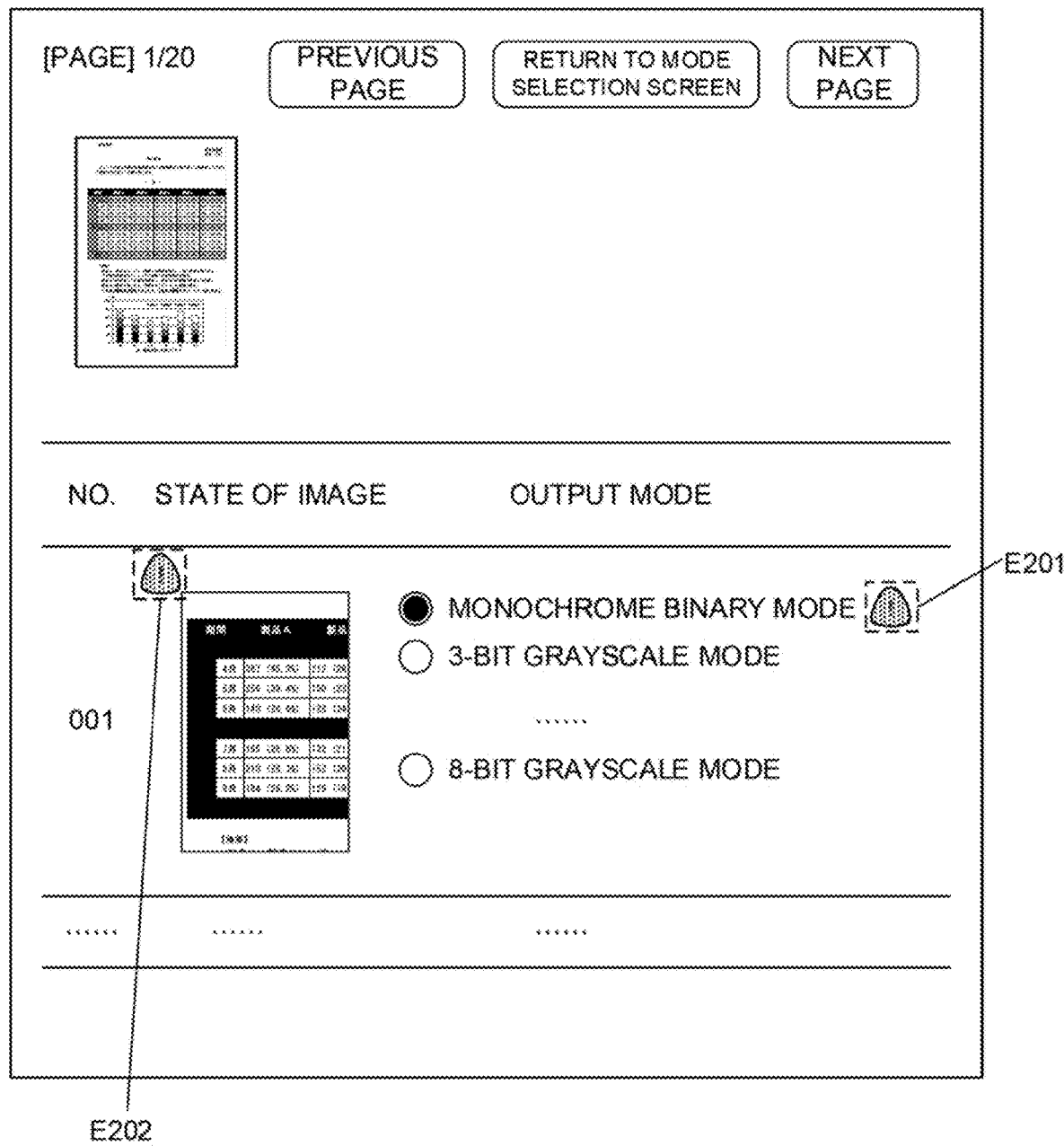
FIG. 18 is a diagram illustrating an example of an operation according to the second embodiment.

A case where the report includes a partial image will be described with reference to FIGS. 17 and 18. If the report includes a partial image, for example, as illustrated in FIG. 17, the terminal device 3 displays the partial image of the area determined as an area where information loss is likely to occur for each output mode selectable by the user, and the partial image and thumbnail image of the push image side by side. By doing so, it is possible to display the locations where information loss is likely to occur in an easy-to-compare form for the user. Alternatively, if there are many output modes selectable by the user, as illustrated in FIG. 18, the terminal device 3 may enable, in a manner allowing for switching in response to a user operation, display of the partial images of the area determined as an area where information loss is likely to occur, for each output mode selectable by the user.

If there is an area determined as an area where information loss is likely to occur, an identifiable display is displayed. For example, as illustrated in FIG. 17, the terminal device 3 displays the thumbnail image for each output mode side by side as a report, and displays an icon E200 in the vicinity of the partial image for the output mode including a location (a pixel block) where information loss is likely to occur. By doing so, during comparing the partial images for each output mode, the user can also confirm whether the output mode is an output mode in which information loss is likely to occur. As illustrated in FIG. 18, by displaying an icon E201 in the vicinity of the portion corresponding to the output mode determined as a mode in which information loss may occur, the terminal device 3 may make the user visibly recognize that there is a possibility of occurrence of an information loss in the output mode. Further, the terminal device 3 may display, in a manner allowing for switching between output modes by a user, a thumbnail image of the output mode selected by the user, and display an icon E202 in the vicinity of the location where information loss is likely to occur. Thus, even if there are many output modes selectable by the user, the user can confirm the degree of information loss by a simple operation.

According to the present embodiment, the user can compare the output modes while confirming the areas where information loss is likely to occur.

3. Third Embodiment

Next, a third embodiment will be described. The third embodiment is an embodiment in which the image forming apparatus 2 outputs the image data in the output mode having the highest appropriateness as the mode for outputting the image data based on the evaluation value, and not in an output mode selected by the user.

The present embodiment can be applied to the first and second embodiments, but a case where the present embodiment is applied to the first embodiment will be described with reference to FIG. 19 that replaces FIG. 7 of the first embodiment. The same numeral or symbol is attached to the same functional element and process, and description thereof is omitted. In the present embodiment, the output mode determiner 212 performs the ACS determination process, the evaluation value calculation processing, and the output mode determination process.

Figure 19:
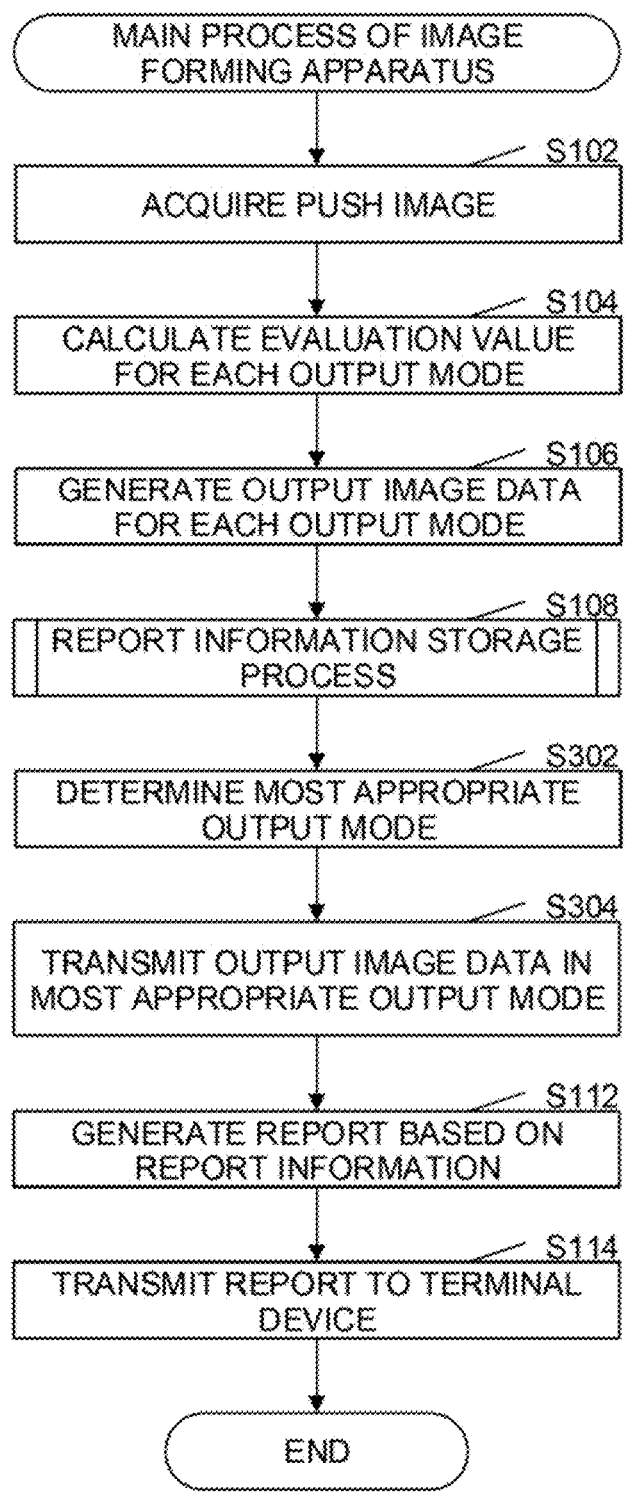
FIG. 19 is a flowchart illustrating a flow of a main process of an image forming apparatus according to a third embodiment.

With reference to FIG. 19, the main process of the image forming apparatus 2 in the present embodiment will be described. In the present embodiment, step S110 being a process of transmitting output image data of the output mode selected by the user is not executed. Instead, the controller 70 determines the most appropriate output mode, based on the evaluation value calculated for each output mode selectable by the user (step S302).

For example, if the controller 70 executes the ACS determination process and determines that the push image is to be output as a monochrome image, the controller 70 scores the evaluation value for each output mode. The score is calculated in consideration of evaluation values such as the degree of information loss and the file size. Then, the controller 70 determines the output mode determined to have the best score as the most appropriate output mode.

Alternatively, the controller 70 may set a threshold value indicating an upper limit of the amount of the degree of information loss through a user setting or the like, and determine the output mode having the largest degree of information loss among the output modes in which the degree of information loss does not exceed the threshold value, as the most appropriate output mode.

The controller 70 controls the transmission and reception device 30 to transmit the output image data in the most appropriate output mode (step S304). The transmission destination of the output image data is specified by the user, and the controller 70 transmits the output image data to the device specified based on the transmission destination specified by the user. For example, the controller 70 transmits the output image data to a device such as the terminal device 3, an e-mail server, an NAS, or the like.

Figure 20:
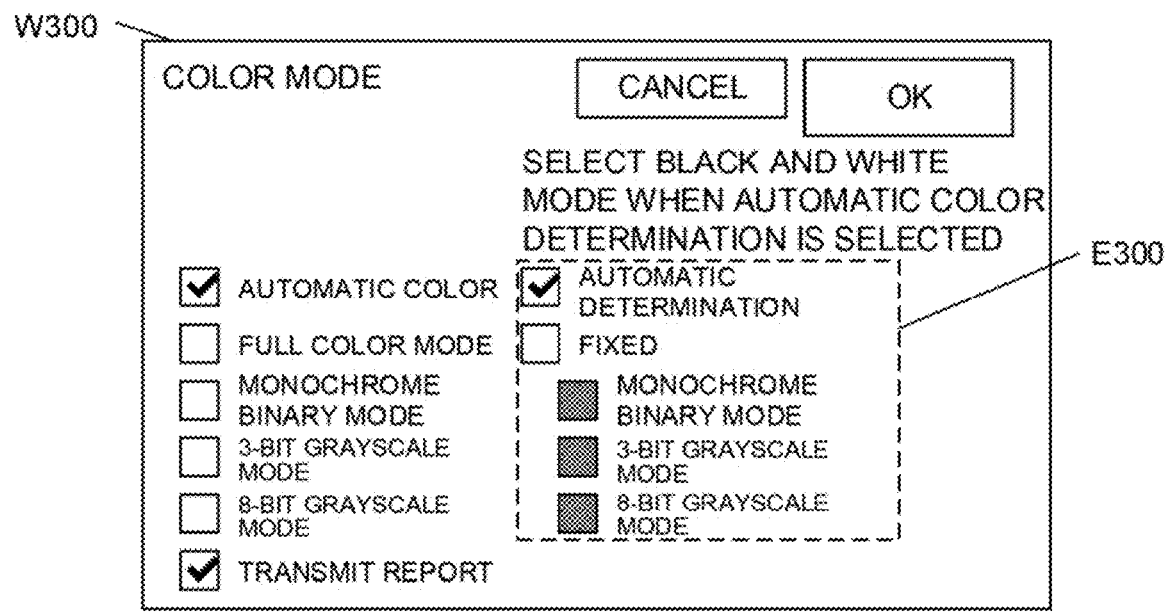
FIG. 20 is a diagram illustrating an example of an operation according to the third embodiment.

FIG. 20 is an example of a display screen W300 displayed on the display 54 of the image forming apparatus 2 before the reading job is executed. The display screen W300 includes an area E300 that specifies an output mode when it is determined by the ACS determination process that the push image is to be output as a monochrome image. In the example in FIG. 20, it is specified that the ACS determination process is enabled and if the ACS determination process determines that the push image is to be output as a monochrome image, an output mode is automatically determined.

Also in a case where the present embodiment is applied to the second embodiment, the present embodiment can be realized by causing the controller 70 to execute steps S302 and S304, instead of executing step S110, in the main process of the image forming apparatus 2.

The statistical value is calculated for each pixel block in the second embodiment, and therefore, in step S302, the controller 70 may determine the most appropriate output mode, based on the statistical value for each pixel block. For example, the statistic of the lost edge amount is calculated for each pixel block and compared with the threshold value, for each output mode, and the value of the number of pixel blocks satisfying the condition or the value corresponding to the number of consecutive pixel blocks satisfying the condition is calculated. That is, a larger calculated value indicates generation of more pixel blocks having a large degree of information loss or more extensive generation of pixel blocks having a large degree of information loss when the push image is output in the output mode. The controller 70 may compare the calculated value with the threshold value set by the user, and determine the output mode having the highest calculated value among the output modes whose calculated value does not exceed the threshold value as the most appropriate output mode.

According to the present embodiment, if the push image is output as a monochrome image, the user can acquire the output image data after causing the image forming apparatus to automatically determine an appropriate output mode. If the user is dissatisfied with the image data output in the automatically determined output mode, the user can reacquire the output image data by specifying the output mode with reference to the report.

4. Fourth Embodiment

Next, a fourth embodiment will be described. The fourth embodiment is an embodiment in which the image forming apparatus transmits a report to the terminal device if a push image is acquired, but does not transmit the output image data corresponding to a specific output mode.

The present embodiment can be applied to either of the first embodiment and the second embodiment, and is realized by specifically skipping step S110 in the main process of the image forming apparatus 2.

Figure 21:
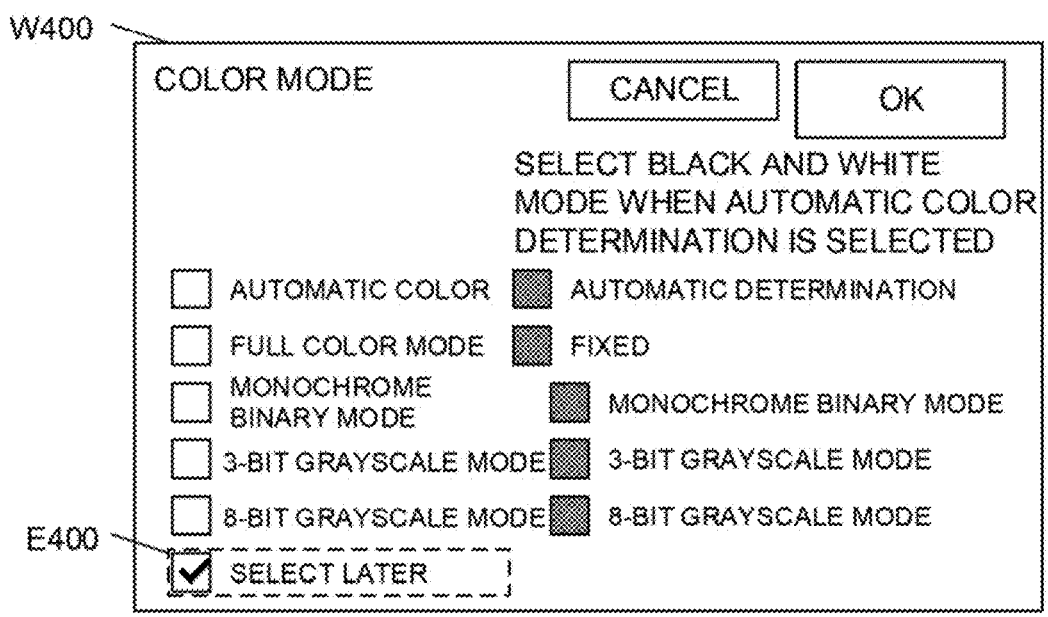
FIG. 21 is a diagram illustrating an example of an operation according to a fourth embodiment.

FIG. 21 is an example of a display screen W400 displayed on the display 54 of the image forming apparatus 2 before the reading job is executed. The display screen W400 includes an area E400 for specifying that the image forming apparatus 2 transmits only a report upon executing a reading job, and output image data is selected after the report is received. If it is specified to select output image data after transmitting the report, the image forming apparatus 2 does not transmit output image data corresponding to a specific output mode, but only transmits the report. By selecting the reacquisition button included in the report, the user can instruct the image forming apparatus 2 to transmit the output image data corresponding to the selected output mode.

According to the present embodiment, the user can cause the image forming apparatus to transmit a report, and select output image data to be acquired while checking the report.

5. Fifth Embodiment

Next, a fifth embodiment will be described. The fifth embodiment is an embodiment in which an image reading device is used instead of the image forming apparatus 2. In the first to fourth embodiments, a configuration is described in which the image processing device according to the present invention is applied to the image processing device included in the image forming apparatus 2, but the present invention is not limited thereto. Therefore, in the present embodiment, an example in which the image processing device according to the present invention is applied to an image processing device included in an image reading device such as a flatbed scanner will be described.

Figure 22:
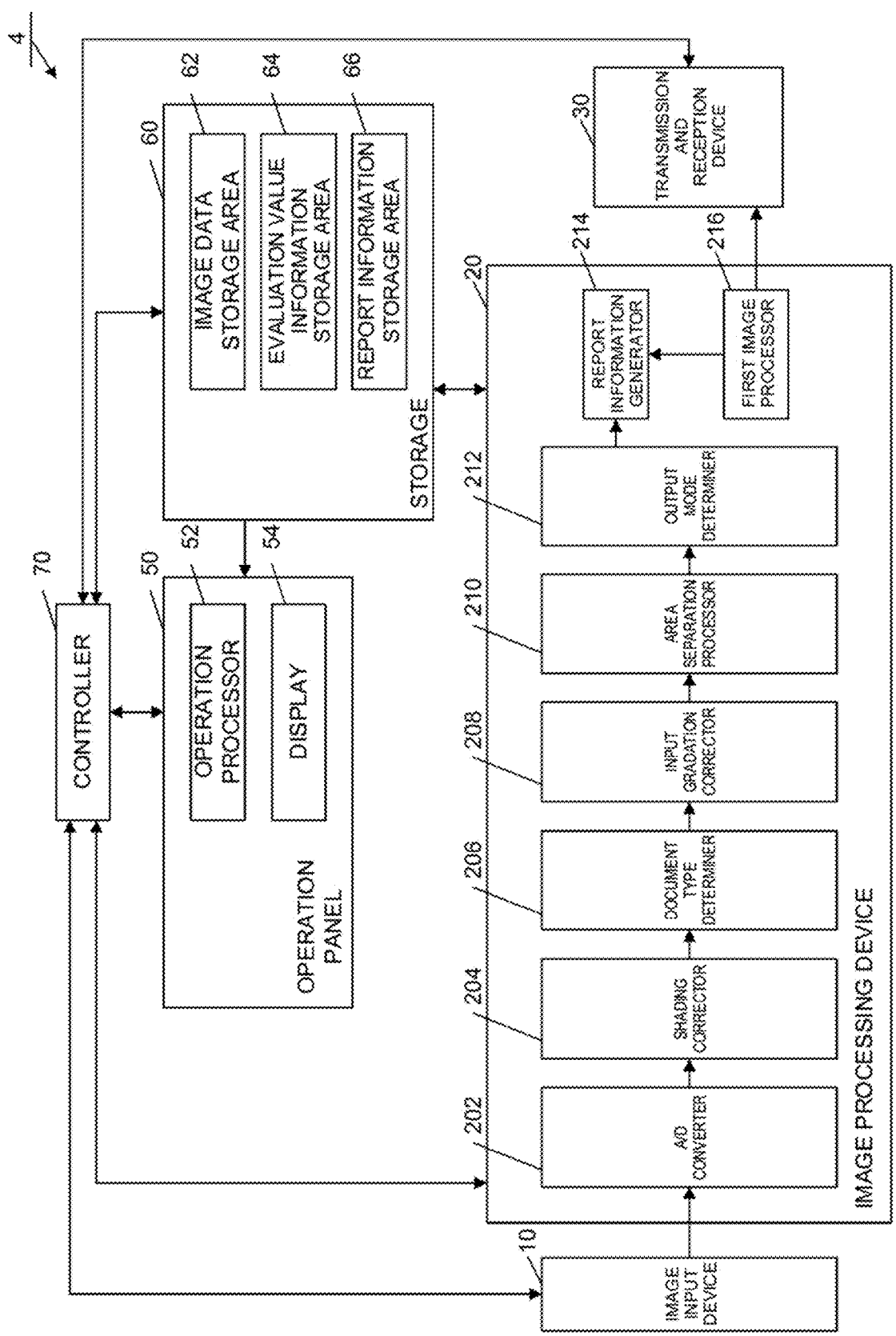
FIG. 22 is a diagram for describing a functional configuration of an image reading device according to a fifth embodiment.

With reference to FIG. 22, a functional configuration of an image reading device 4 in the present embodiment will be described. As illustrated in FIG. 22, the image reading device 4 includes the image input device 10, the image processing device 20, the transmission and reception device 30, the operation panel 50, the storage 60, and the controller 70. On the other hand, unlike the image forming apparatus 2, the image reading device 4 does not include the second image processor 218 and the image output device 40. Therefore, the image reading device 4 executes only the process of transmitting the output image data to an external device via the transmission and reception device 30.

Various processes executed by the image reading device 4 are controlled by a controller 70 (a computer including a processor such as a CPU or DSP) provided in the image reading device, and the same processes as those described in the first embodiment are executed.

The image reading device 4 is not limited to a scanner, and may be, for example, a digital still camera, a document camera, or an electronic device equipped with a camera (such as a mobile phone, a smartphone, and a tablet terminal).

6. Sixth Embodiment

The above-described image processing device may be implemented by a logic circuit (hardware) formed on an integrated circuit (IC chip) or the like, or may be implemented by software using a Central Processing Unit (CPU).

In the latter case, the image processing device is provided with a CPU that executes instructions of a program being software for realizing functions, a Read Only Memory (ROM) or a storage device (referred to as "recording medium") in which the program and various data are recorded in a format readable by a computer (or the CPU), a Random Access Memory (RAM) for developing the program, and the like. The computer (or the CPU) reads the program from the recording medium and executes the program, thereby achieving the object of the present invention. Examples of the recording medium include "non-transitory tangible media" such as a tape, a disk, a card, a semiconductor memory, and a programmable logic circuit. The program may be supplied to the computer via any transmission medium (such as a communication network and a broadcast wave) capable of transmitting the program. The present embodiment may also be realized in the form of a data signal embedded in a carrier wave, in which the program is embodied by electronic transmission.

7. Modification

The present invention is not limited to the above embodiments, and can have various modifications. That is, embodiments obtained by combining technical means appropriately changed within the scope not departing from the gist of the present invention are also included in the technical scope of the present invention.

Although the above-described embodiments have portions described separately for convenience of description, it is needless to say that the embodiments may be combined and executed within a technically possible range.

A program operating in each of the devices in the embodiments is a program (a program for causing a computer to function) for controlling a CPU and the like to realize the functions of the above-described embodiments. Information processed by these devices is temporarily stored in a temporary storage device (such as a RAM) at the time of processing the information, and then stored in storage devices such as various types of read only memories (ROMs) and HDDs, and read or corrected and written by the CPU, as necessary.

Here, examples of a storage medium for storing the program may include a semiconductor medium (such as a ROM and a non-volatile memory card), an optical storage medium/magneto-optical storage medium (such as a Digital Versatile Disc (DVD), a Magneto Optical Disc (MO), a Mini Disc (MD), a Compact Disc (CD), and a Blu-ray Disc (BD) (registered trademark)), and a magnetic storage medium (such as magnetic tape and a flexible disk). In addition to a case the functions of the above-described embodiments are realized by executing the loaded program, there may be a case where the functions of the present invention are realized as a result of processing that based on the instructions of the program and is performed in cooperation with an operating system, another application program, or the like.

If the program is distributed to a market, the program may be stored in a portable recording medium to be distributed, or the program may be transferred to a server computer connected via a network such as the Internet. In this case, of course, a storage device of the server computer is also included in the present invention.

What is claimed is:

1. A system, comprising:
    an image processing device connected to a transmission and reception device that communicates with an external device; and
    a terminal device connected to a display device, wherein the image processing device includes
        an evaluation value calculation processor that calculates, for each of two or more types of output modes, an evaluation value of output image data when image data is output in the output mode, and
        an evaluation information transmitter that transmits evaluation information including information based on the evaluation value for each of the output modes, to the terminal device, via the transmission and reception device, and
    the terminal device includes
        a display controller that performs control of displaying, for each of the output modes, the information based on the evaluation value corresponding to the output mode, on the display device, if the evaluation information is received,
    wherein
        the image processing device further includes an identifier that identifies, for each of the output modes, a block having a large degree of information loss among blocks composed of one or a plurality of pixels of the image data,
        the evaluation information includes information indicating a block having a large degree of information loss, and the display controller displays, for each of the output modes, a block having a large degree of information loss.

2. The system according to claim 1, wherein the evaluation information includes, for each of the output modes, information relating to reacquisition of the corresponding output image data,
- the terminal device further includes a reacquisition request transmitter that transmits, based on the information relating to reacquisition of the output image data, a request for reacquiring the output image data, to the image processing device, and
- the image processing device further includes an output image data transmitter that transmits, if the request is received, the output image data corresponding to the received request, to the terminal device that has transmitted the request.

3. The system according to claim 1, wherein the evaluation information includes a thumbnail image of the output image data for each of the output modes, and
- the display controller displays, for each of the output modes, the thumbnail image corresponding to the output mode.

4. The system according to claim 1, wherein the display controller displays, for each of the output modes, information indicating appropriateness of outputting in the output mode.

5. The system according to claim 1, wherein the image processing device further includes
- an output mode determiner that determines, based on the evaluation value, which of the two or more types of output modes is the most appropriate as the output mode of the image data, and
- an output image data transmitter that transmits, to a device specified by a user, the output image data in the most appropriate output mode.

6. The system according to claim 1, wherein, if a request for transmitting the evaluation information is received from the terminal device, the evaluation information transmitter transmits the evaluation information.

7. The system according to claim 1, wherein the image processing device is connected to an input device that reads a document and inputs the document as image data.

8. An image processing device connected to a transmission and reception device that communicates with an external device, the image processing device comprising:
- an evaluation value calculation processor that calculates, for each of two or more types of output modes, an evaluation value of output image data when image data is output in the output mode, and
- an evaluation information transmitter that transmits evaluation information including information based on the evaluation value for each of the output modes, to another device, via the transmission and reception device, wherein
- the image processing device further includes an identifier that identifies, for each of the output modes, a block having a large degree of information loss among blocks composed of one or a plurality of pixels of the image data,
- the evaluation information includes information indicating a block having a large degree of information loss.

9. The image processing device according to claim 8, wherein the evaluation information includes, for each of the output modes, information relating to reacquisition of the corresponding output image data, and
- the image processing device further includes an output image data transmitter that transmits, if a request based on the information relating to reacquisition of the output image data is received from the other device to which the evaluation information has been transmitted, the output image data corresponding to the received request, to the other device.

\* \* \* \* \*